United States Patent
Brody et al.

(10) Patent No.: US 11,502,978 B2
(45) Date of Patent: Nov. 15, 2022

(54) MESSAGING SYSTEM FOR RESURFACING CONTENT ITEMS

(71) Applicant: Snap Inc., Santa Monica, CA (US)

(72) Inventors: Jonathan Dale Brody, Marina del Rey, CA (US); Alexander Collins, Santa Monica, CA (US); Benedict Copping, Los Angeles, CA (US); Justin Huang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/948,457

(22) Filed: Sep. 18, 2020

(65) Prior Publication Data
US 2021/0409357 A1    Dec. 30, 2021

Related U.S. Application Data

(60) Provisional application No. 63/046,594, filed on Jun. 30, 2020.

(51) Int. Cl.
*G06F 15/16*  (2006.01)
*H04L 51/046*  (2022.01)
(Continued)

(52) U.S. Cl.
CPC ............ *H04L 51/046* (2013.01); *H04L 51/10* (2013.01); *H04L 51/216* (2022.05); *H04L 51/52* (2022.05)

(58) Field of Classification Search
CPC ....... H04L 51/046; H04L 51/16; H04L 51/10; H04L 51/32
See application file for complete search history.

(56) References Cited

U.S. PATENT DOCUMENTS 6,667,978 B1    12/2003    Delp et al.
10,560,057 B1 *   2/2020    Fabrikant ................ G06F 9/451
(Continued)

FOREIGN PATENT DOCUMENTS

WO    WO-2011135300 A2    11/2011
WO    WO-2022005794 A1    1/2022

OTHER PUBLICATIONS

"Surprise!", [Online] Retrieved from the Internet: <URL: https://www.snap.com/en-US/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
(Continued)

*Primary Examiner* — Suraj M Joshi
*Assistant Examiner* — Jaren Means
(74) *Attorney, Agent, or Firm* — Schwegman Lundberg & Woessner, P.A.

(57) ABSTRACT

Methods, computer-readable storage media, and apparatuses for surfacing content items in a messaging system. The methods may include storing content items generated by a client device of a user. The method may further include determining a time period and content items corresponding to the time period to resurface to the user, the time period selected based on comparing the social interaction data, the viewing data, and the modification data associated with the content items corresponding to the time period with the social interaction data, the viewing data, and the modification data associated with content items generated during other time periods. The method may further include generating a title page for the time period to resurface to the user, the title page comprising a title and an indication of a date for the time period.

19 Claims, 20 Drawing Sheets

(51) Int. Cl.
*H04L 51/10* (2022.01)
*H04L 51/52* (2022.01)
*H04L 51/216* (2022.01)

(56) References Cited

U.S. PATENT DOCUMENTS

| | | | |
|---|---|---|---|
| 2013/0339440 A1* | 12/2013 | Balassanian | H04L 67/306 |
| | | | 709/204 |
| 2014/0189539 A1* | 7/2014 | St. Clair | G06Q 50/01 |
| | | | 715/753 |
| 2015/0020096 A1* | 1/2015 | Walker | G06Q 30/0255 |
| | | | 725/34 |
| 2016/0241504 A1* | 8/2016 | Raji | G06Q 50/01 |
| 2017/0277377 A1 | 9/2017 | Siu et al. | |
| 2017/0277740 A1 | 9/2017 | Ghotbi et al. | |
| 2017/0286423 A1* | 10/2017 | Shorman | G06F 16/248 |

OTHER PUBLICATIONS

Etherington, Darrell, "Snapchat Gets its Own Timeline With Snapchat Stories, 24- Hour Photo and Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

"International Application Serial No. PCT/US2021/038285, International Search Report dated Oct. 13, 2021", 3 pgs.

"International Application Serial No. PCT/US2021/038285, Written Opinion dated Oct. 13, 2021", 4 pgs.

\* cited by examiner

US 11,502,978 B2

MESSAGING SYSTEM FOR RESURFACING CONTENT ITEMS

CLAIM OF PRIORITY

This application claims the benefit of priority to U.S. Provisional Application Ser. No. 63/046,594, filed on Jun. 30, 2020, which is incorporated herein by reference in its entirety.

BACKGROUND

To engage users of a messaging system, the messaging system needs to ensure that the users have content to consume that is engaging. The content may include many content items that are generated by the user, other users, and by sources outside the messaging system. Often the number of content items that are generated by a user is extensive. It may be difficult for the user to review the content items the user has generated, which may deprive both the user and friends of the user within the messaging system from consuming engaging content items.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
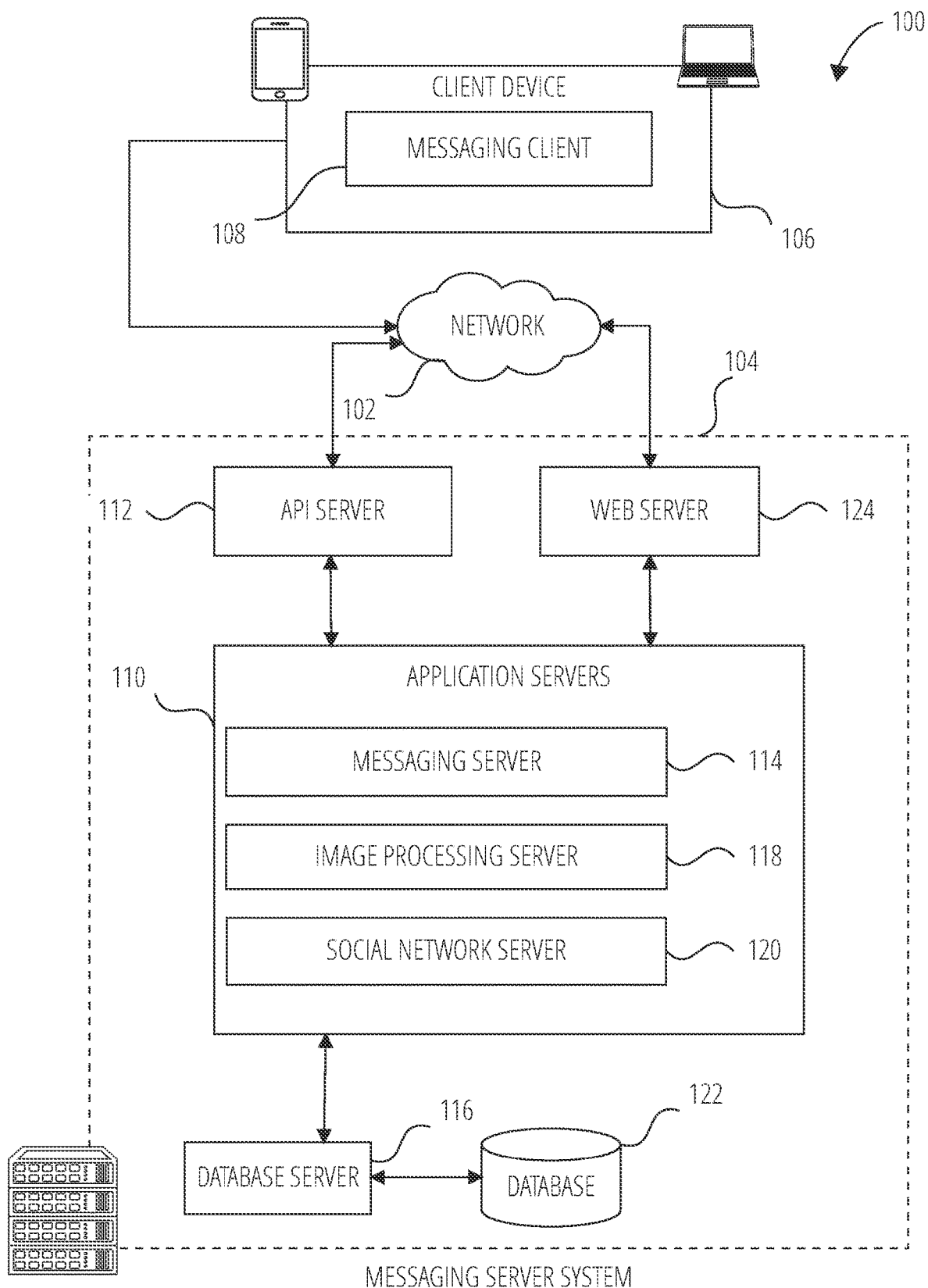
FIG. 1 is a diagrammatic representation of a networked environment in which the present disclosure may be deployed, in accordance with some examples.

A messaging system for resurfacing content items is disclosed. The messaging system resurfaces content items that were generated by a user. As an example, a user may use his or her mobile device to capture content items, such as videos and photos. A user typically takes many videos and photos so that it is difficult for the user to view the content items the user has generated. After several months and years there may be many thousands of content items, which makes it difficult for the user to locate any particular content item. Additionally, one value of the messaging system may be in providing engaging content to the user. One way to provide the user with engaging content is to offer the user a day of content items from a day where the user was engaged with the content items the user generated. The day may be called a "Flash Back" day.

Organizing the storage of the messaging system so that content items that are engaging may be offered by the messaging system to the users may be difficult due to the large number of content items available and the low number of content items that may be presented to a user.

The messaging system stores the content items along with related usage information such as social interaction data, viewing data, and modification data. The messaging system determines a day or days that should be offered to the user as resurfaced content or a "Flash Back" based on the number of content items generated by the user and the usage data. The messaging system, in some embodiments, filters the usage data stored with the content items to preserve the confidentiality of the users. In other embodiments the messaging system scores usage data as it is generated, such as daily. Each day is thus associated with a score and the messaging system can search back for days with a high score to resurface the content items from that day.

In some embodiments, there is selection criteria that weighs usage data differently depending on the type of usage data. For example, when the user modifies an image or video with text captions and media overlays this may be weighed more than a view of the content item. In some embodiments, the messaging system analyzes the content items to identify objects such as faces, cars, people, buildings, and so forth. The messaging system may then evaluate the day further based on the objects identified in the content items. In some embodiments, the messaging system determines whether a day corresponds with an event such as a national holiday, personal holiday, entertainment event, and so forth. The messaging system may weigh days that correspond with events more heavily than days that do not correspond to events.

In some embodiments, the messaging system determines whether to offer the resurfaced content items in comparison with other content that may be determined to be more engaging to the user. For example, there may be new users on the system that have posted content items that the system determines the user would find more engaging than the resurfaced content items. In some embodiments, the messaging system includes all content items generated by the user during a day with the resurfaced content items. In some embodiments, the messaging system only considers days where many content items have been generated by the user. For example, only days where the number of content items generated by the user is greater than certain percentage, such as ninety percent, of the number of content items generated on other days.

There are several technical problems that the messaging system solves. One technical problem is how to locate and present content items to the user that the user is likely to find engaging. The messaging system solves this technical problem by evaluating content items per day with a weighing system based on usage data associated with the content items. The technical solution may have the technical effect of enabling the messaging system to organize the content items so that the messaging system only need access content items that are engaging to the user in order to present the user with engaging content items.

Another technical problem is how to determine which content items are engaging without compromising the privacy of the user. The messaging system solves this technical problem by storing the usage data without identifying information of the user, in accordance with some embodiments. In other embodiments, the messaging system solves this technical problem by keeping a running score for a day and then deleting or not storing the usage data associated with the user. The technical effect is that content items may be analyzed for usage without exposing the usage data of the user to potential hacking.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the Internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

Figure 3:
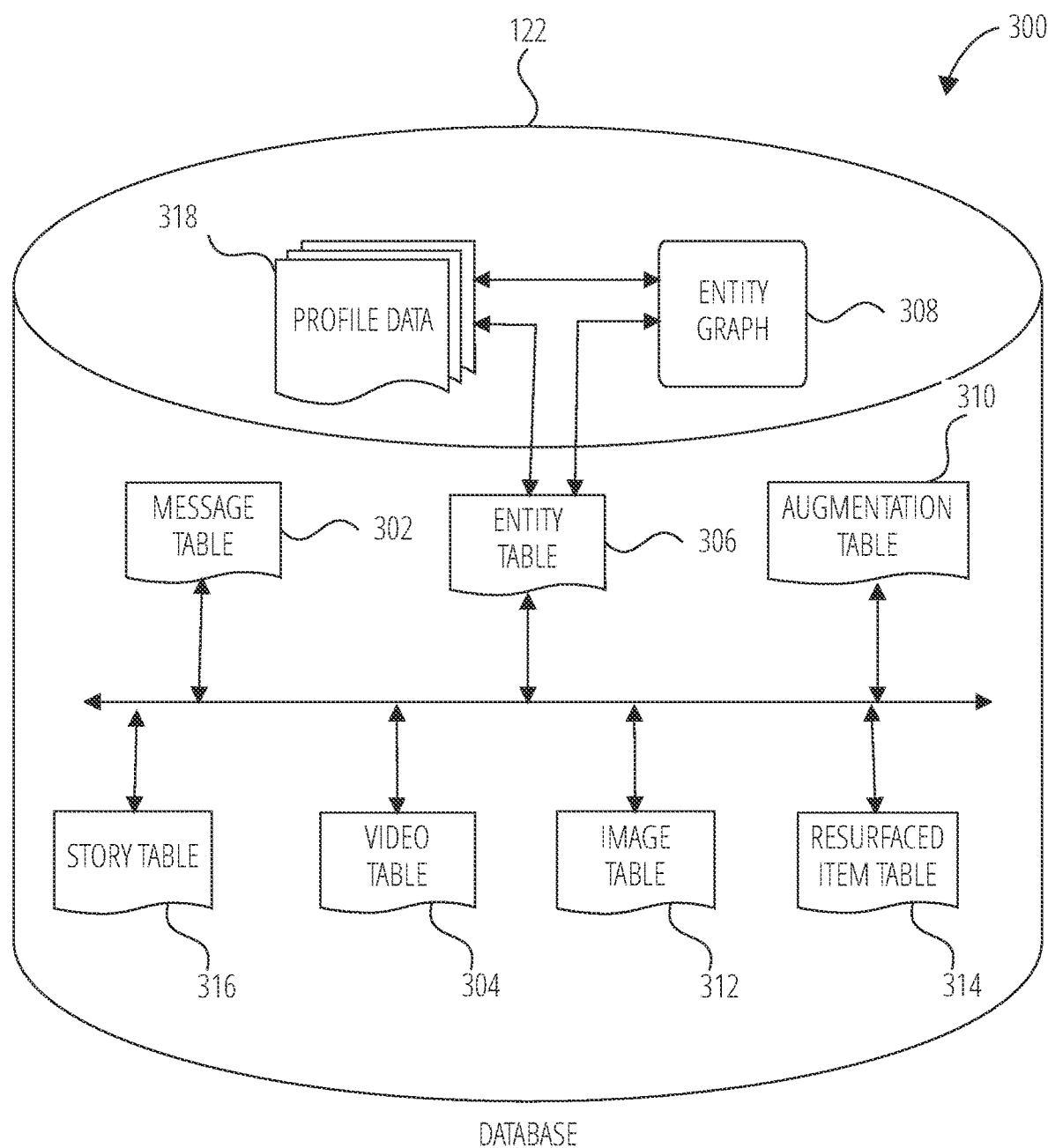
FIG. 3 is a diagrammatic representation of a data structure as maintained in a database, in accordance with some examples.

The social network server 120 supports various social networking functions and services and makes these functions and services available to the messaging server 114. To this end, the social network server 120 maintains and accesses an entity graph 308 (as shown in FIG. 3) within the database 122. Examples of functions and services supported by the social network server 120 include the identification of other users of the messaging system 100 with which a particular user has relationships or is "following," and also the identification of other entities and interests of a particular user.

System Architecture

Figure 2:
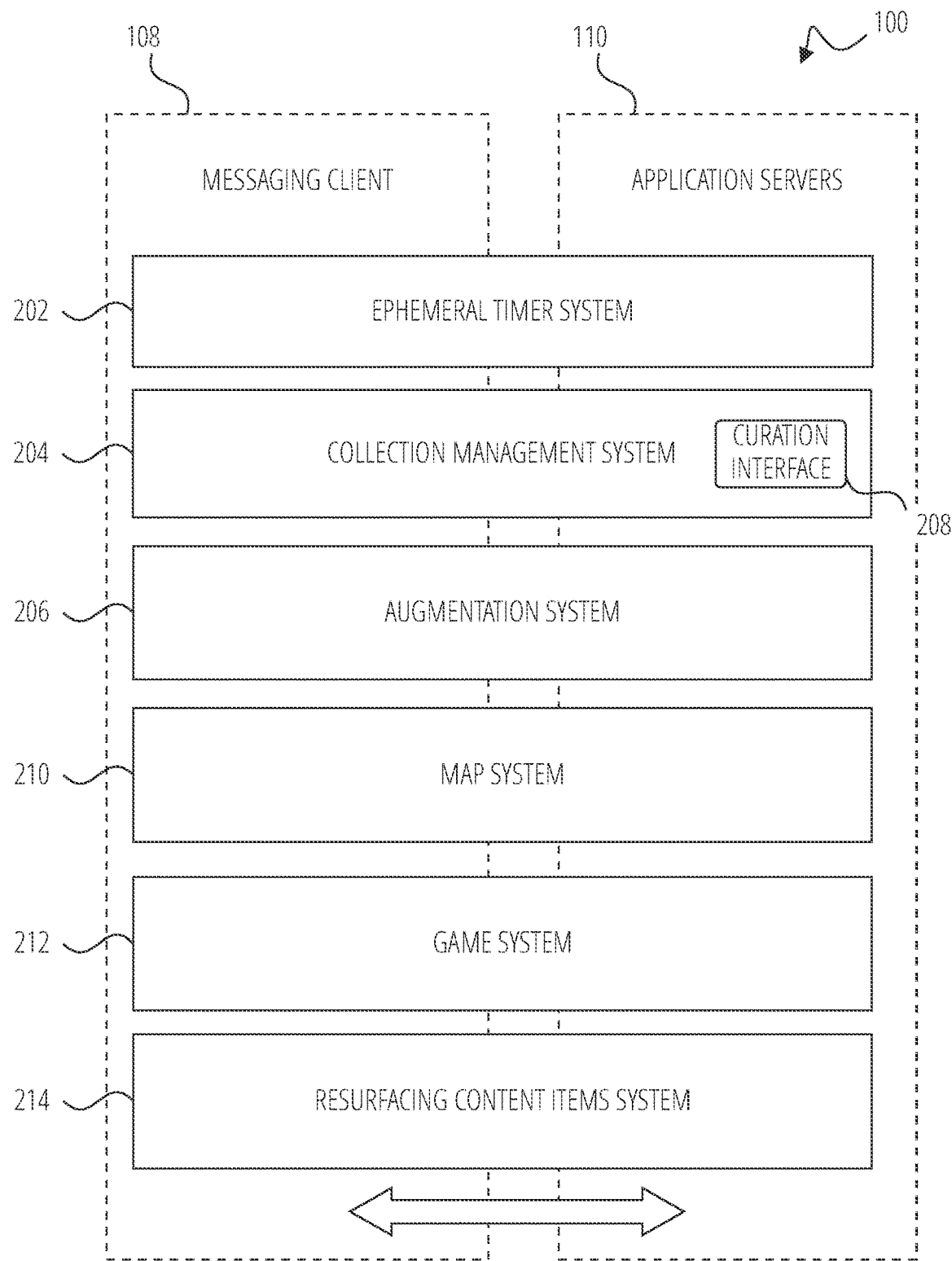
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a resurfacing content items system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars (e.g., stored in profile data 318) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The resurfacing content items system 214 provides functionality to resurface a content items 704 or plurality thereof. The resurfacing content items system 214 is disclosed in conjunction with FIG. 7.

Data Architecture

FIG. 3 is a schematic diagram illustrating data structures 300, which may be stored in the database 122 of the messaging server system 104, according to certain examples. While the content of the database 122 is shown to comprise a number of tables, it will be appreciated that the data could be stored in other types of data structures (e.g., as an object-oriented database).

The database 122 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 318. Entities for which records are maintained within the entity table 306 may include individuals, corporate entities, organizations, objects, places, events, and so forth. Regardless of entity type, any entity regarding which the messaging server system 104 stores data may be a recognized entity. Each entity is provided with a unique identifier, as well as an entity type identifier (not shown).

The entity graph 308 stores information regarding relationships and associations between entities. Such relationships and associations may be social, professional (e.g., work at a common corporation or organization) interested-based or activity-based, merely for example.

The profile data 318 stores multiple types of profile data about a particular entity. The profile data 318 may be selectively used and presented to other users of the messaging system 100, based on privacy settings specified by a particular entity. Where the entity is an individual, the profile data 318 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 108 to other users. The collection of avatar representations may include "status avatars," which present a graphical representation of a status or activity that the user may select to communicate at a particular time.

Where the entity is a group, the profile data 318 for the group may similarly include one or more avatar representations associated with the group, in addition to the group name, members, and various settings (e.g., notifications) for the relevant group.

The database 122 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 108 when the sending user is composing a message. Other types of filters include geolocation filters (also known as geo-filters), which may be presented to a sending user based on geographic location. For example, geolocation filters specific to a neighborhood or special location may be presented within a user interface by the messaging client 108, based on geolocation information determined by a Global Positioning System (GPS) unit of the client device 106.

Another type of filter is a data filter, which may be selectively presented to a sending user by the messaging client 108, based on other inputs or information gathered by the client device 106 during the message creation process. Examples of data filters include current temperature at a specific location, a current speed at which a sending user is traveling, battery life for a client device 106, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 106 and then displayed on a screen of the client device 106 with the modifications. This also includes modifications to stored content, such as video clips in a gallery that may be modified. For example, in a client device 106 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 106 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 106) and perform complex image manipulations locally on the client device 106 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 106.

In some examples, a computer animation model to transform image data can be used by a system where a user may capture an image or video stream of the user (e.g., a selfie) using a client device 106 having a neural network operating as part of a messaging client application 104 operating on the client device 106. The transformation system operating within the messaging client 108 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 106 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 316 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 108 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 108, to contribute content to a particular live story. The live story may be identified to the user by the messaging client 108, based on his or her location. The end result is a "live story" told from a community perspective.

A further type of content collection is known as a "location story," which enables a user whose client device 106 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The database 122 can also store resurfaced content items 710, time periods 732, selection criteria 708, content items from other users 720, and filtered usage data 726 in the resurfaced item table 314.

Data Communications Architecture

Figure 4:
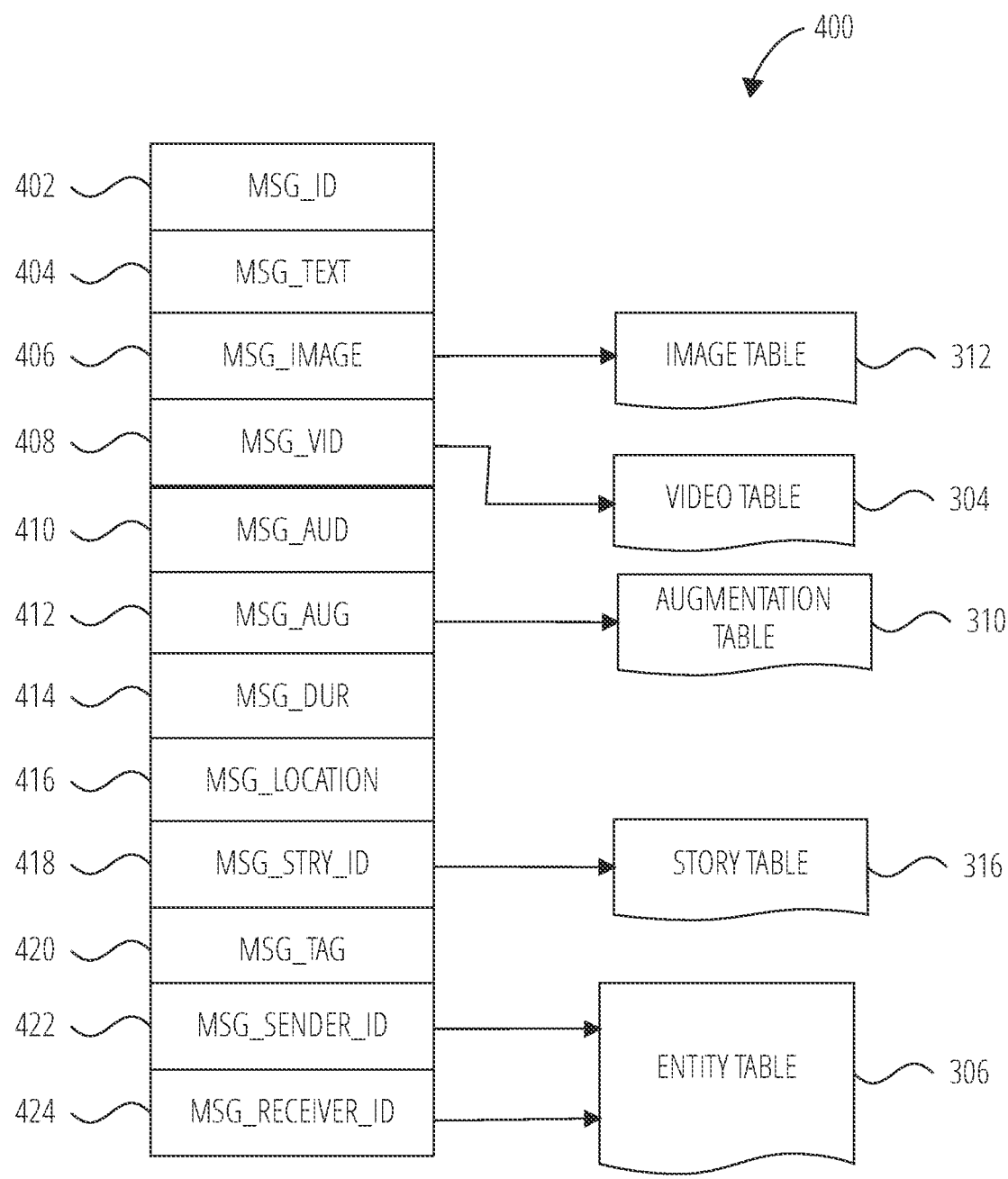
FIG. 4 is a diagrammatic representation of a message, in accordance with some examples.

FIG. 4 is a schematic diagram illustrating a structure of a message 400, according to some examples, generated by a messaging client 108 for communication to a further messaging client 108 or the messaging server 114. The content of a particular message 400 is used to populate the message table 302 stored within the database 122, accessible by the messaging server 114. Similarly, the content of a message 400 is stored in memory as "in-transit" or "in-flight" data of the client device 106 or the application servers 110. A message 400 is shown to include the following example components:

message identifier 402: a unique identifier that identifies the message 400.

message text payload 404: text, to be generated by a user via a user interface of the client device 106, and that is included in the message 400.

message image payload 406: image data, captured by a camera component of a client device 106 or retrieved from a memory component of a client device 106, and that is included in the message 400. Image data for a sent or received message 400 may be stored in the image table 312.

message video payload 408: video data, captured by a camera component or retrieved from a memory component of the client device 106, and that is included in the message 400. Video data for a sent or received message 400 may be stored in the video table 304.

message audio payload 410: audio data, captured by a microphone or retrieved from a memory component of the client device 106, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 108.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 316) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 106 on which the message 400 was generated and from which the message 400 was sent.

message receiver identifier 424: an identifier (e.g., a messaging system identifier, email address, or device identifier) indicative of a user of the client device 106 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 316, and values stored within the message sender identifier 422 and the message receiver identifier 424 may point to user records stored within an entity table 306.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
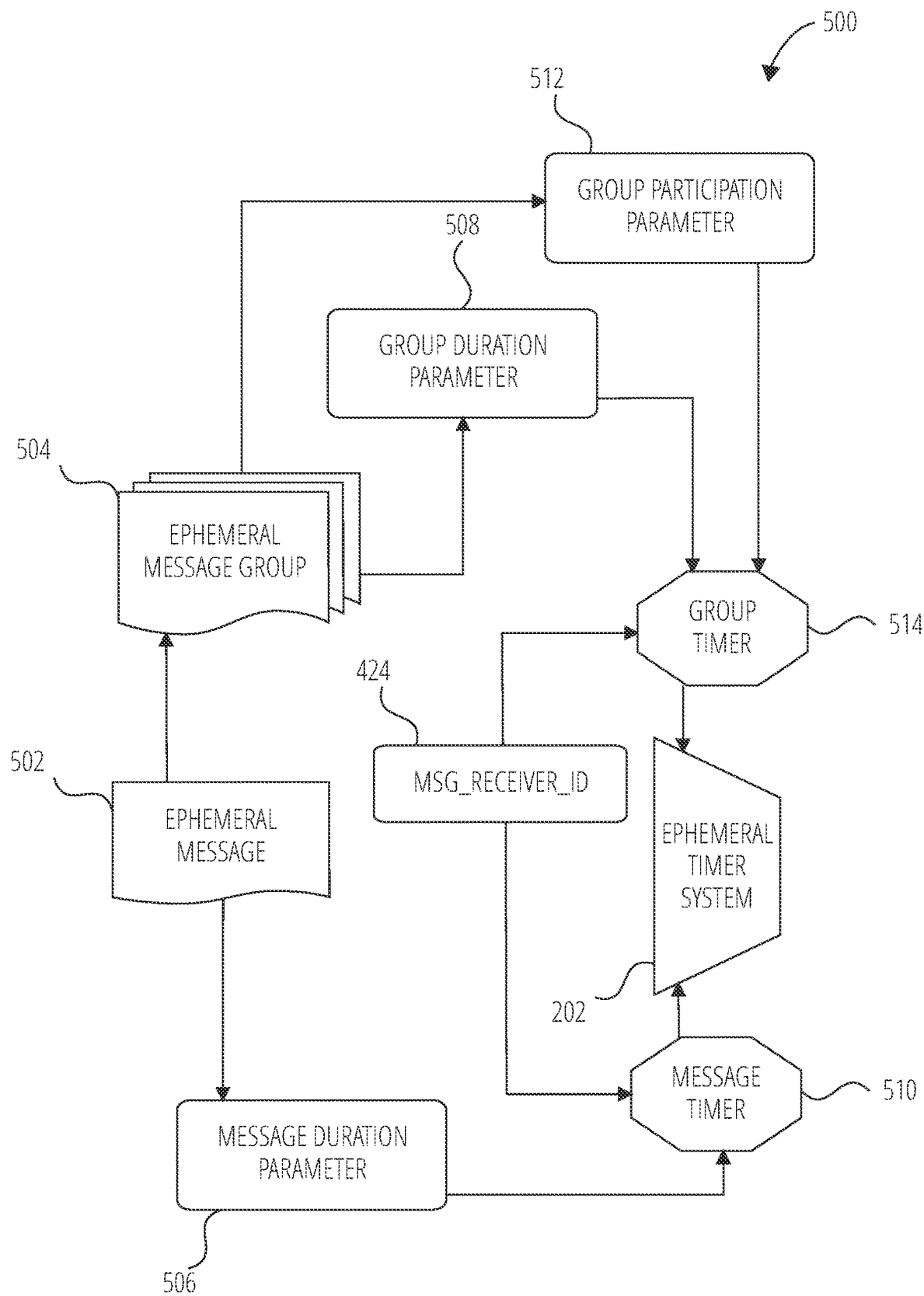
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 108. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 108) to cause an indicium (e.g., an icon) associated with the relevant ephemeral message group 504 to no longer be displayed within a user interface of the messaging client 108. Similarly, when the ephemeral timer system 202 determines that the message duration parameter 506 for a particular ephemeral message 502 has expired, the ephemeral timer system 202 causes the messaging client 108 to no longer display an indicium (e.g., an icon or textual identification) associated with the ephemeral message 502.

Messaging System for Resurfacing Content Items Architecture

Figure 6:
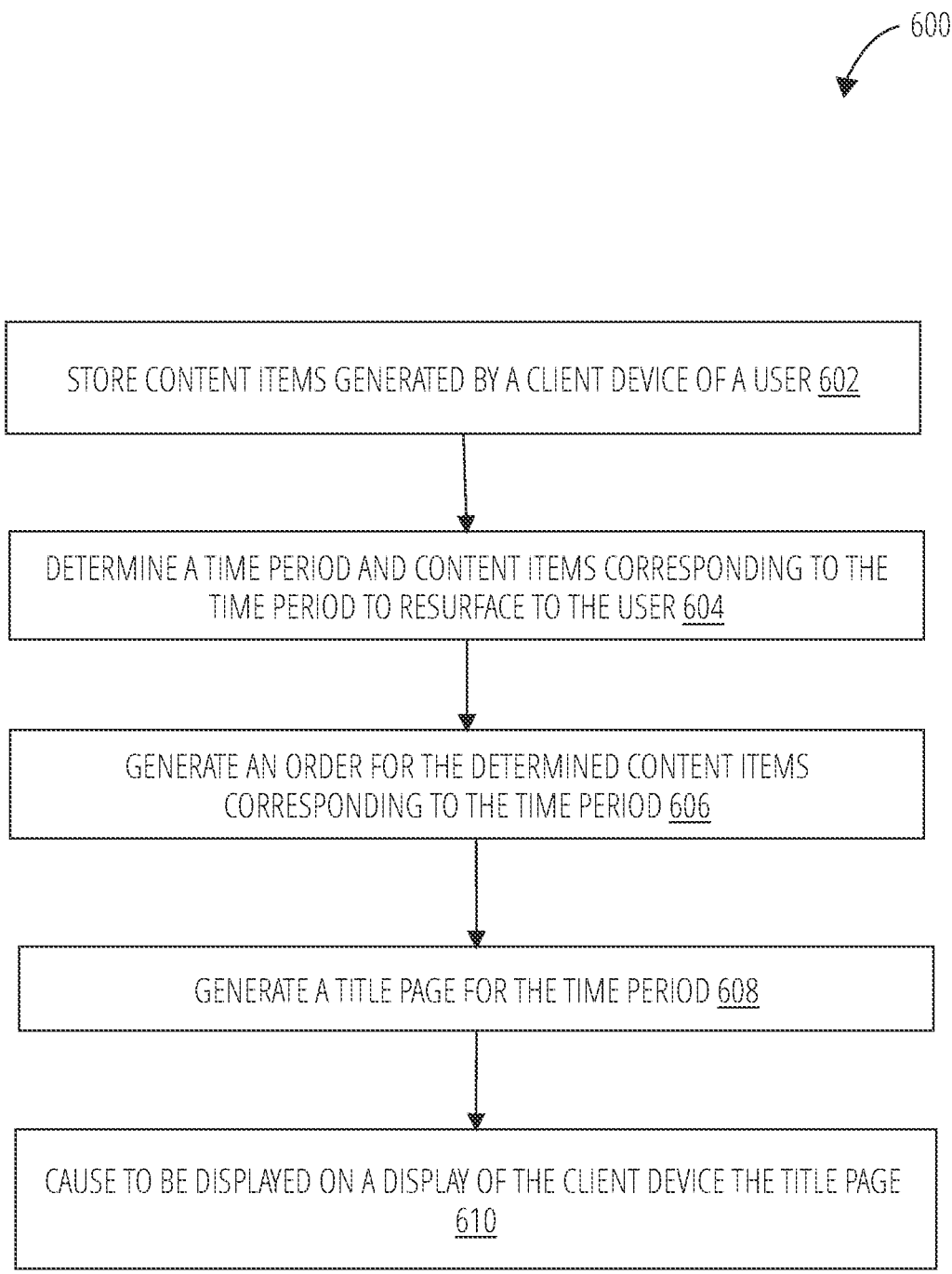
FIG. 6 illustrates a method 600 in accordance with one embodiment.

FIG. 6 illustrates a method 600 of resurfacing content items, in accordance with some embodiments. In operation 602, method 600 stores content items generated by a client device of a user. For example, operation 602 may include storing content items generated by a client device of a user, the content items stored with associated social interaction data, viewing data, modification data, and a date. For example, referring to FIG. 7, the client device 106 or messaging server system 104 may store the content items 704 with associated data such as usage data 730 or filtered usage data 726. In some embodiments, the generate resurfaced content items module 706 receives information regarding the usage data 730 or filtered usage data 726 and determines a score based on the selection criteria 708 to add to scores 734.

In operation 604, method 600 determines a time period of and content items corresponding to the time period to resurface to the user. In some embodiments, operation 604 includes determining a time period and content items corresponding to the time period to resurface to the user, the time period selected based on comparing the social interaction data, the viewing data, and the modification data associated with the content items corresponding to the time period with the social interaction data, the viewing data, and the modification data associated with content items generated during other time periods. For example, generate resurfaced content items module 706 selects a day from time periods 732 based on comparing the content items 704, usage data 730, filtered usage data 726, and scores 734, associated with the day compared the content items 704, usage data 730, filtered usage data 726, and scores 734, associated with other days of time periods 732.

In operation 606, method 600 generates an order for content items corresponding to the time period. In some embodiments, operation 606 includes generating an order of the content items corresponding to the period to resurface to the user. For example, generate resurfaced content items module 706 generates an order such as chronological for the content items 704 associated with the day of the time periods 732 as disclosed in conjunction with FIG. 7.

In operation 608, method 600 generates a title page for the day. In some embodiments, operation 608 includes generating a title page for the time period to resurface to the user, the title page comprising a title and an indication of a date for the time period. For example, generate resurfaced content items module 706 may generate a title page 1102 as disclosed in conjunction with FIG. 7 and FIG. 11.

Figure 7:
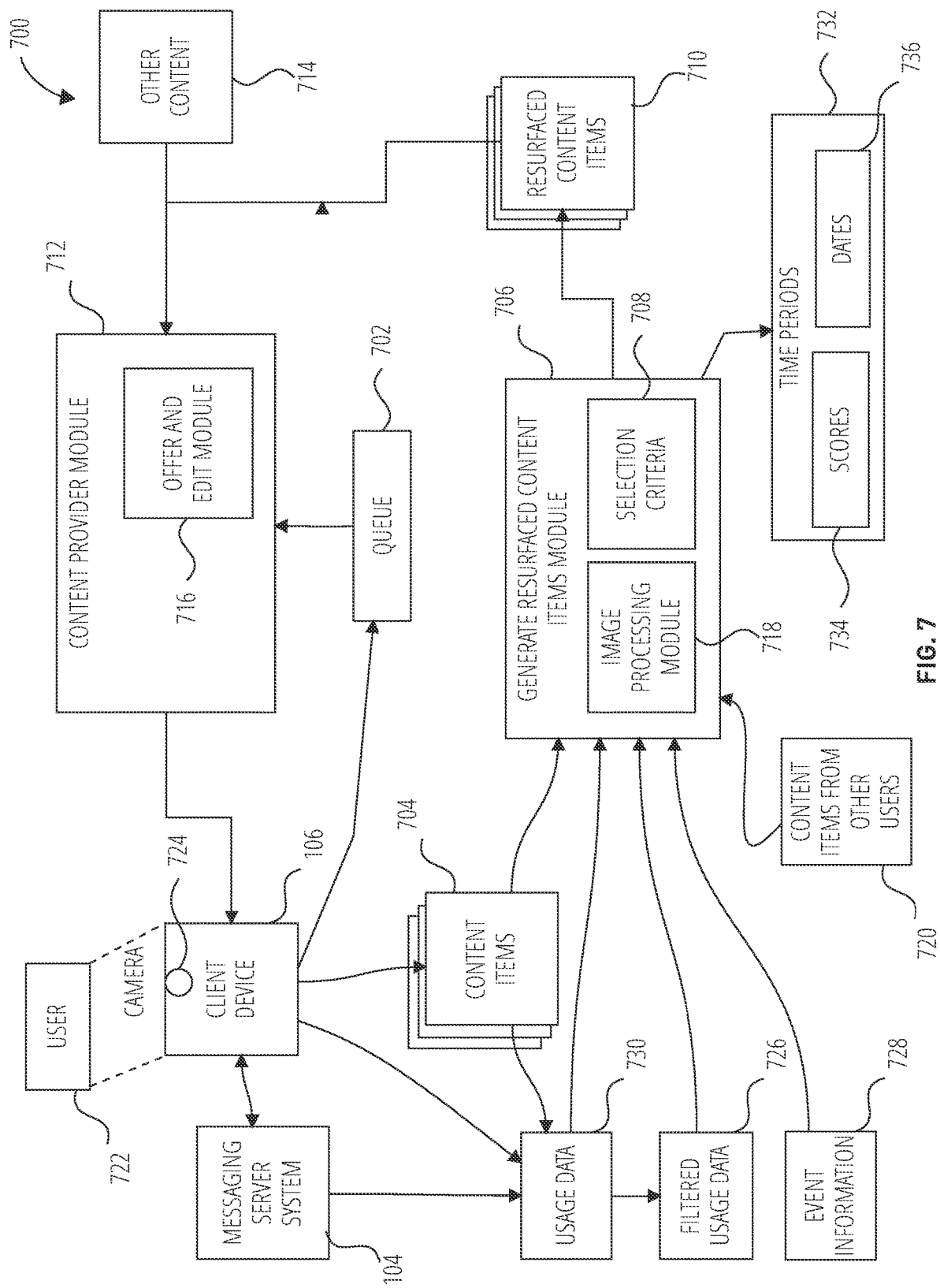
FIG. 7 illustrates a messaging system 600 for resurfacing content item in accordance with some embodiments.

In operation 610, method 600 causes to be displayed on a display of the client device the title page. In some embodiments, operation 610 includes causing to be displayed, on a display of the client device, the title page with user interface items, the user interface items comprising options for the user to dismiss the time period and corresponding content items, to send the time period and content items corresponding to the time period to another user, and to edit the content items corresponding to the time period. Referring to FIG. 7, generate resurfaced content items module 706 generates resurfaced content items 710, which may then be processed by content provider module 712. Content provider module 712 may select resurfaced content items 710 and cause resurface resurfaced content items 710 to be displayed on the client device 106 of user 722.

FIG. 7, FIG. 8, FIG. 9, FIG. 10, FIG. 11, and FIG. 12 are described in conjunction with one another. FIG. 7 illustrates a messaging system 700 for resurfacing content items, in accordance with some embodiments. The user 722 uses a client device 106 and interacts with the messaging server system 104 to generate content items 704. The client device 106 includes a camera 724, which may be one of the environmental components 1834 of FIG. 18. The user 722 generates or produces the content items 704 using the camera 724 and the client device 106.

The messaging server system 104 or client device 106 maintains usage data 730 and filtered usage data 726 regarding the content items 704. The usage data 730 and filtered usage data 726 includes, referring to FIG. 8, information or data such as the social interaction data 802, the viewing data 804, and the modification data 808. In some embodiments the messaging server system 104 protects the privacy of the user 722 by filtering usage data 730 and storing the filtered usage data 726. Some of the usage data 730 associated with the user 722 is filtered and not stored in the resurfaced item table 314 of FIG. 3. For example, username, address, account identifier, and so forth, are not stored to protect the privacy of the user 722, in accordance with some embodiments. The messaging server system 104 may filter usage data 730 to generate filtered usage data 726.

Figure 8:
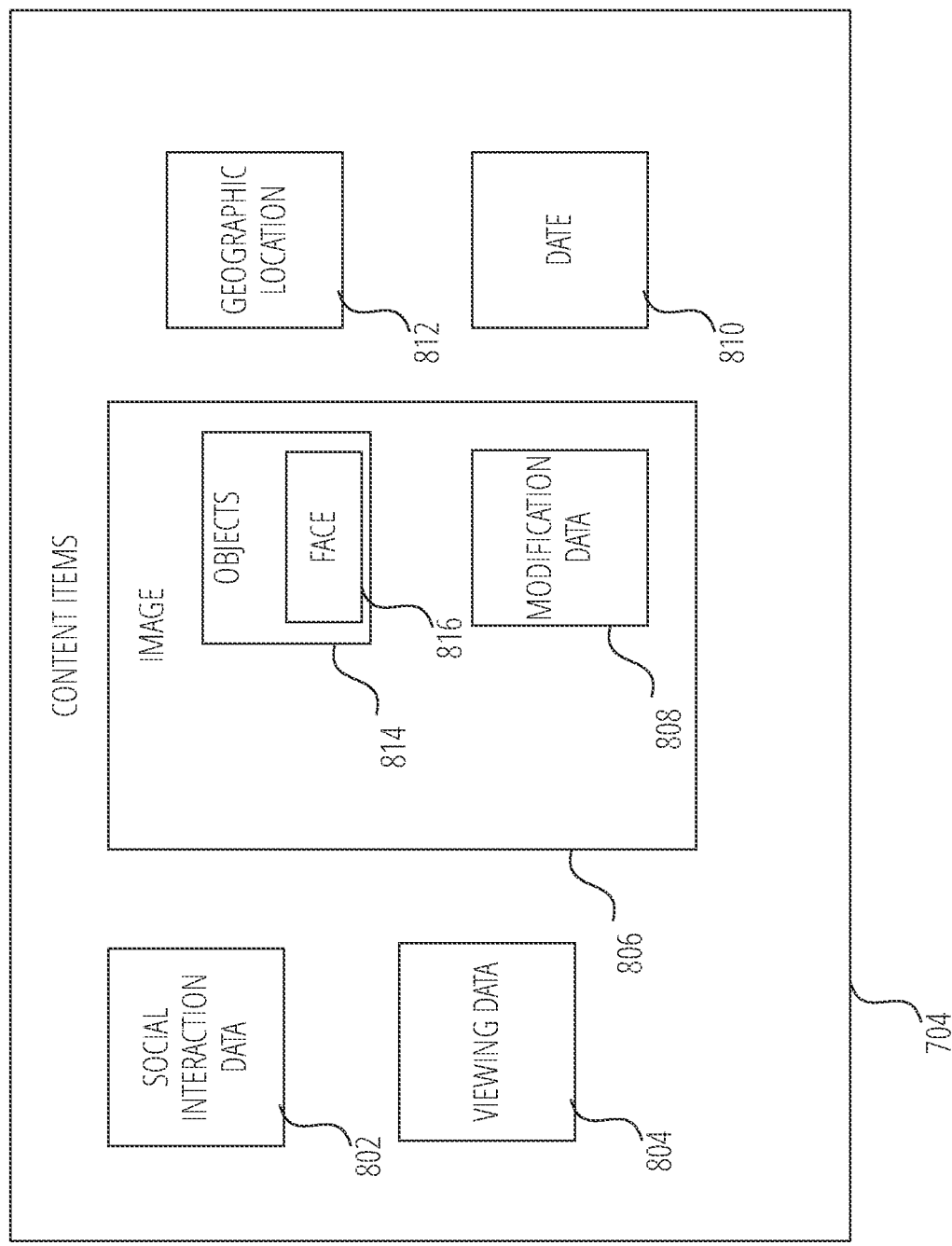
FIG. 8 further illustrates a structure of content items 704, according to some embodiments.

FIG. 8 further illustrates a structure of content items 704, according to some embodiments. Content items 704 include associated social interaction data 802, viewing data 804, image 806, modification data 808, date 810, and geographic location 812, as shown in FIG. 8. Additional data or information may be associated with content items 704 such as geographic location 812 and date 810. The messaging server system 104 or client device 106 associates geographic location 812 and date 810 with the content items 704, in accordance with some embodiments.

The image 806 is generated by the camera 724. The image 806 may be a video or photograph. There may be multiple objects 814 in the image 806. Objects 814 are portions of the image 806 that are identifiable as images of objects such as a face 816. Content items 704 include text and no associated image 806, in accordance with some embodiments. In some examples, the social interaction data 802 includes a textual chat between two or more users of the messaging system 100.

The social interaction data 802 includes information or data that indicates interaction with content items 704. The social interaction data 802 includes a number of times the user 722 who generated the content items 704 selects save 902, story 906, send 908, or chat 904 for the content items 704. The social interaction data 802 may include a number of times a user 722 who is viewing content items 704 received from another user selects chat 1002, resend 1004, or another selection that indicates interaction with the content items 704.

The viewing data 804 indicates information or data that indicates viewing of the content items 704. The viewing data 804 includes how long and how many times the user 722 views the content items 704, how long and how many times the user 722 that did not generate the content items 704 views the content items 704.

Modification data 808 is data that is associated with the image 806 and may be added by the augmentation system 206 such as a text caption, a media overlay, or other data. The modification data 808 includes a number of times the user 722 modifies the content items 704. The modification data 808 may include an indication of importance of a modification of the content items 704 such as an indication of a text message size or how complicated an image modification is, which may include an indication of how much effort it was for the user 722 to add the modification to the image 806 or whether the modification data 808 was from stock items or was customized by the user 722.

Figure 9:
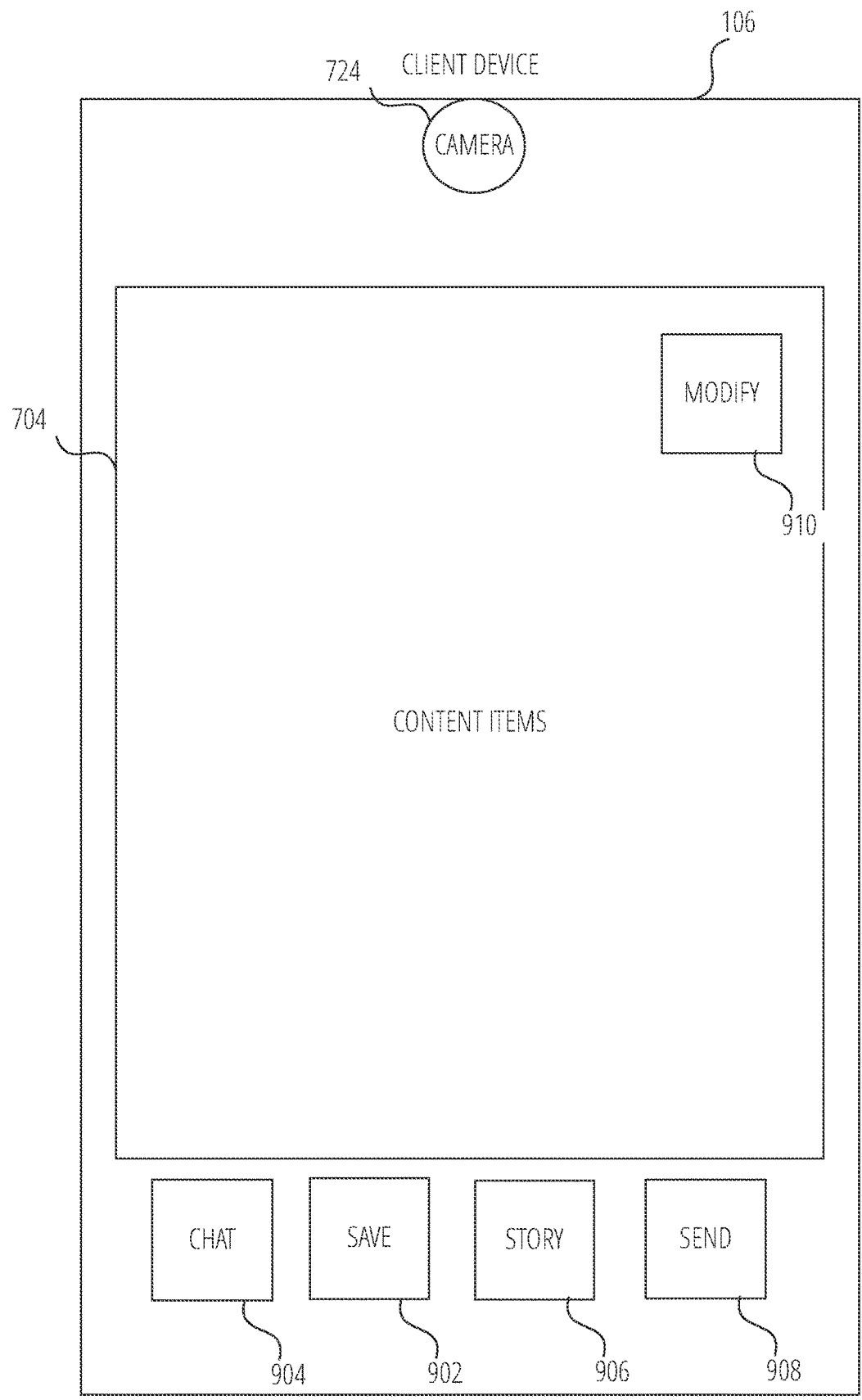
FIG. 9 illustrates a client device 106, in accordance with some embodiments.

FIG. 9 illustrates a client device 106, in accordance with some embodiments. The client device 106 is displaying content items 704 with various user interface items that include modify 910, chat 904, save 902, story 906, and send 908. A user 722 may have just captured the content items 704 and is presented with the user interface items chat 904, save 902, story 906, and send 908. The user 722 may chat 904 with another user. For example, the user 722 may select an account of another user of the messaging system 100 and exchange a message 400. The user 722 may save the content items 704 to a storage device of the client device 106 such as storage unit 1818 or a storage unit such as resurfaced item table 314. The user 722 may store the content items 704 as part of a story 906 such as story table 316 where other users may view the content items 704 in the story table 316. The user 722 may send 908 the content items 704 as part of a message 400 to another user. The user 722 may modify the content items 704 such as by adding a text caption or a media overlay or other modification data 808 that is associated with the image 806 and may be added by the augmentation system 206.

Figure 10:
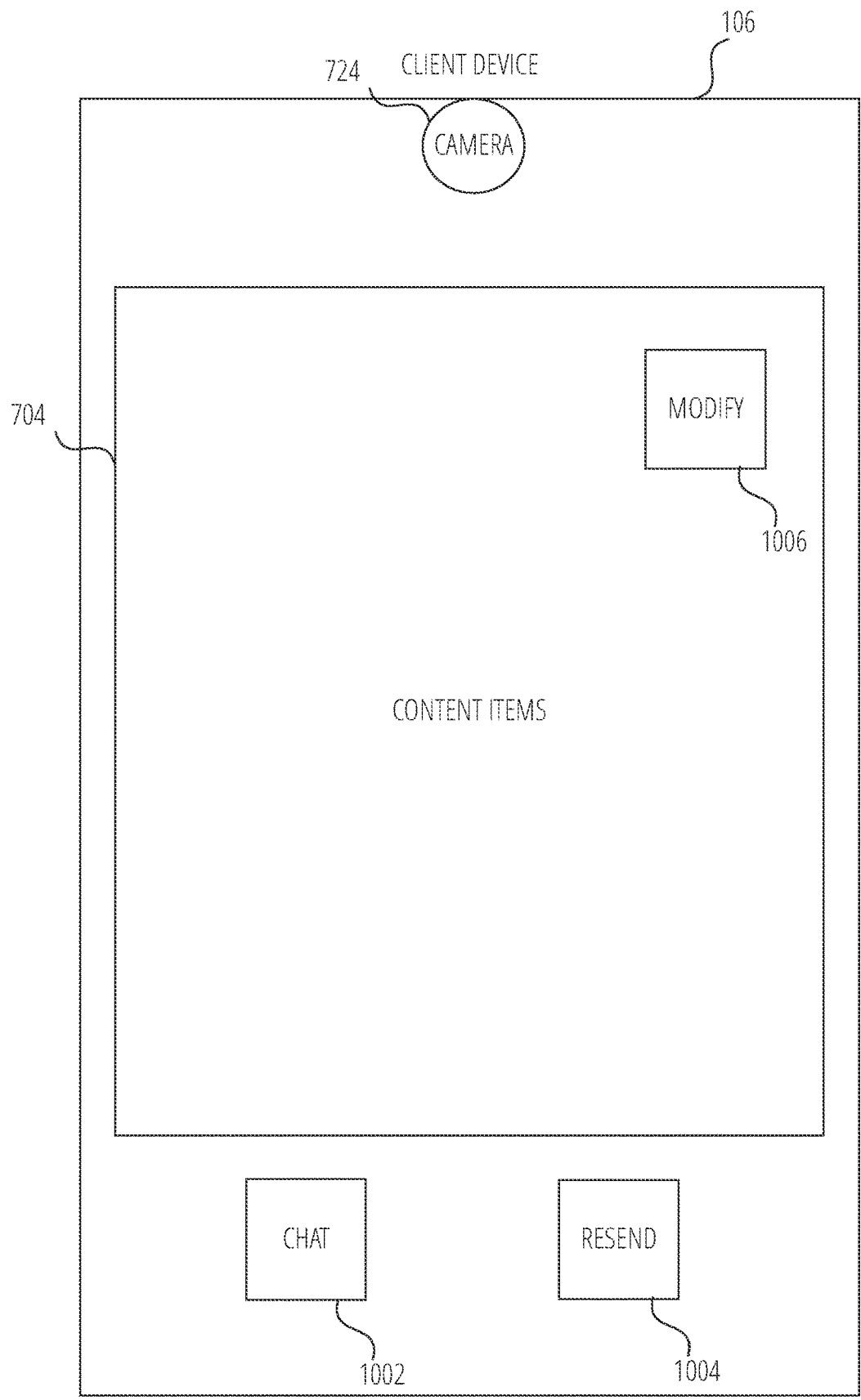
FIG. 10 illustrates a client device 106, in accordance with some embodiments.

FIG. 10 illustrates a client device 106, in accordance with some embodiments. The client device 106 is displaying content items 704. The content items 704 may be from another user or may have been generated by the user 722 and retrieved for viewing. User interface items are presented to the user 722 that include modify 1006, chat 1002, and resend 1004, in accordance with some embodiments. The modify 1006 user interface item may be the same or similar as modify 910. The chat 1002 user interface item may be the same or similar as chat 904. The resend 1004 enables the user 722 to resend 1004 the content items 704 to a different user. The user interface items may include other items presented to or available to the user 722 such as deleting the content items 704, reporting the content items 704 to the messaging system 100 as being inappropriate, and so forth.

Returning to FIG. 7, the generate resurfaced content items module 706 examines the content items 704, filtered usage data 726, usage data 730, and content items from other users 720 and generates resurfaced content items 710. The generate resurfaced content items module 706 includes image processing module 718 and selection criteria 708. The image processing module 718 processes the image 806 of FIG. 8 of the content items 704 to identify objects in the content items 704. The selection criteria 708 is criteria that is used by the generate resurfaced content items module 706 to select resurfaced content items 710.

In some embodiments, the generate resurfaced content items module 706 maintains a datastore such as resurfaced item table 314 of time periods 732. The time periods 732 includes scores 734 and dates 736. A time period of time periods 732 is often one date of dates 736 but may extend to two dates 736. For example, the time period may be a date such as Dec. 24, 2020, but may extend past midnight into the next date. The generate resurfaced content items module 706 or another module receives usage data 730 or filtered usage data 726 and maintains scores 734 by assigning a score to usage data 730 such as a number of views of content items 704 and then updates scores 734 with the assigned scores. In this way, the usage data 730 may be discarded after scores 734 has been updated so that the user 722 confidentiality may be maintained. The generate resurfaced content items module 706 uses selection criteria 708 to determine how to weight different usage data 730. In some embodiments, generate resurfaced content items module 706 uses filtered usage data 726 and selection criteria 708 to determine scores 734. For example, the filtered usage data 726 may be maintained in resurfaced item table 314 and generate resurfaced content items module 706 may search resurfaced item table 314 based on selection criteria 708 to determine scores 734. In an example, generate resurfaced content items module 706 searches resurfaced item table 314 every X days of the month such as the second, third, and fourth Friday and determines resurfaced content items 710 based on the usage data 730 or filtered usage data 726 and the selection criteria 708. The selection criteria 708 may include event information 728. For example, event information 728 may include information such as national holidays, personal dates such as birthdays, work dates such as first day at work, entertainment dates such as a concert the user 722 is going to, and so forth.

The selection criteria 708 includes weights for adjusting scores 734 for time periods 732 that are events included in event information 728. For example, the weights may be increased for time periods 732 that are events so that time periods 732 that are events are more likely to be selected as resurfaced content items 710. In other examples, the weights may be decreased for time periods 732 that are events to compensate for the greater probability of content items 704 being generated on dates 736 that are events. In some embodiments, the selection criteria 708 is based further on content items from other users 720. For example, if there are a lot of content items from other users 720 generated during a time period of time periods 732, then the selection criteria 708 may determine that the time period is a special event and give usage data 730 for the date a higher weight. In another example, if there are many content items 704 being generated at a geographic location 812, then the selection criteria 708 determines it is a special event and increases the weights for that time period of the time periods 732. The selection criteria 708 may include a threshold for a number of content items 704 generated during a time period for content items 704 for that time period to be considered for resurfaced content items 710. For example, the selection criteria 708 indicates that only dates that are at or above a predefined threshold in terms of number of content items 704 generated by the user 722 are considered for resurfaced content items 710. The predefined threshold may be a percentage such as ninety-percent or another percentage. The predefined threshold indicates that for content items 704 during a time period to be considered for resurfaced content items 710 a number of content items 704 generated by the user 722 on the day must be greater than or equal to a number of content items 704 generated by the user 722 on during other time periods.

The image processing module 718 processes content items 704 to determine modification data 808. The image processing module 718 processes content items 704 to determine objects 814 such as a face 816. The image processing module 718 may process content items 704 to identify objects 814 in the content items 704 such as a music concert, landmark, animal, building, sporting event, article of clothing, sporting object, or other object. In some embodiments, the selection criteria 708 indicates that a greater weight is given for content items 704 that are generated for a same objects 814. For example, if a plurality of content items 704 are generated during a predetermined time period and include a same objects 814 such as a face 816, then the selection criteria 708 may give a greater weight to the content items 704.

In some embodiments, the selection criteria 708 gives a greater weight for content items 704 that are generated at a same geographic location 812. For example, if a predetermined number of content items 704 are generated within a physical location such as a museum, then the selection criteria 708 may give greater weight to the content items 704. In some embodiments, the selection criteria 708 gives a greater weight for viewing data 804 that indicates that content items 704 generated on a date 810 are viewed after the date 810. The confidentiality of a user 722 may be maintained by not keeping track of which content items 704 are viewed and how long they are viewed, but by attributing scores 734 based on the usage data 730 and then not storing the usage data 730. For example, if content items 704 was a single image 806 that was viewed by the user 722 two days after it was generated, then the score of the scores 734 for the single image 806 can be updated for the time periods 732 and then the information that the user 722 viewed the image 806 can be discarded.

In some embodiments, the selection criteria 708 is dynamically changed based on whether the user 722 interacts with the resurfaced content items 710 offered to the user 722 on the client device 106. For example, generate resurfaced content items module 706 may be given feedback from content provider module 712 that the user 722 interacts with resurfaced content items 710 more often when a number of content items 704 in the resurfaced content items 710 is greater than an average number of content items 704 in the resurfaced content items 710. The selection criteria 708 for the user 722 may be adjusted to weigh the number of the content items 704 for a time period of the time periods 732 more heavily than, for example, viewing data 804. The selection criteria 708 then updates the weights to favor more content items 704 over viewing data 804 for determining the scores 734 for a particular user 722.

The following example illustrates the operation of generate resurfaced content items module 706 determining a score of scores 734 for a time period of time periods 732. A user 722 generates a content item of content items 704 when the user 722 captures an image 806. Generate resurfaced content items module 706 determines that selection criteria 708 assigns a weight of one (1) for taking an image 806 so scores 734 for a date of dates 736 is updated by adding one to scores 734. In some embodiments, a score of scores 734 is stored with a date 810. In the remainder of this example it is understood that the score of scores 734 is determined and then may be stored in time periods 732 either with a date 810, which may include a time, or a cumulative score may be maintained for a date 810. The user 722 may take another image 806. Generate resurfaced content items module 706 may determine that selection criteria 708 indicates a score for a second image 806 within a predetermine time of a first image 806 receives a score of 1.1. The user 722 may add modification data 808 to the second image 806. Generate resurfaced content items module 706 may determine that selection criteria 708 indicates a score of 5 for modification data 808 being added to an image 806. The user 722 may send 908 the image 806 to a friend. Generate resurfaced content items module 706 may determine that selection criteria 708 indicates sending an image 806 to a friend receives a score of 5. The user 722 may take another image 806. Generate resurfaced content items module 706 may determine that selection criteria 708 indicates that taking a third image 806 within a predetermined time receives a score of 1.3. Generate resurfaced content items module 706 may determine that all the images are taken within a location such as a museum. Generate resurfaced content items module 706 may determine that selection criteria 708 indicates that a multiplier of 2 should be used for all the scores 734 taken within the museum where geographic location 812 is used to determine if the image 806 is taken within the museum. Generate resurfaced content items module 706 may update the scores according to the multiplier of 2. The user 722 views the first image 806. Generate resurfaced content items module 706 may determine that selection criteria 708 indicates a value of 3 should be used for viewing an image 806. Generate resurfaced content items module 706 may adjust the scores 734 based on the date 810 indicating a special date such as a holiday. For example, generate resurfaced content items module 706 may determine that selection criteria 708 indicates a multiplier of 2 should be used if the date 810 indicates a special personal day such as a birthday for the user 722.

Generate resurfaced content items module 706 may determine that a time period of time periods 732 is over. For example, it may be the next day. Generate resurfaced content items module 706 then deletes the usage data 730 for the content items 704 for the period of time. Generate resurfaced content items module 706 will then rely on the score that was determined for the date 810 to determine whether to use the date 810 for resurfaced content items 710. In alternative embodiments, generate resurfaced content items module 706 may sum up tuples of scores 734 that are associated with a date 810 when determining a time period of time periods 732 to use for resurfaced content items 710. Other data may be stored in time periods 732 such as a number of image 806 taken so that predetermined cutoff for a number of images may be used. Other adjustments to the scores 734 may be used as indicated herein.

Figure 11:
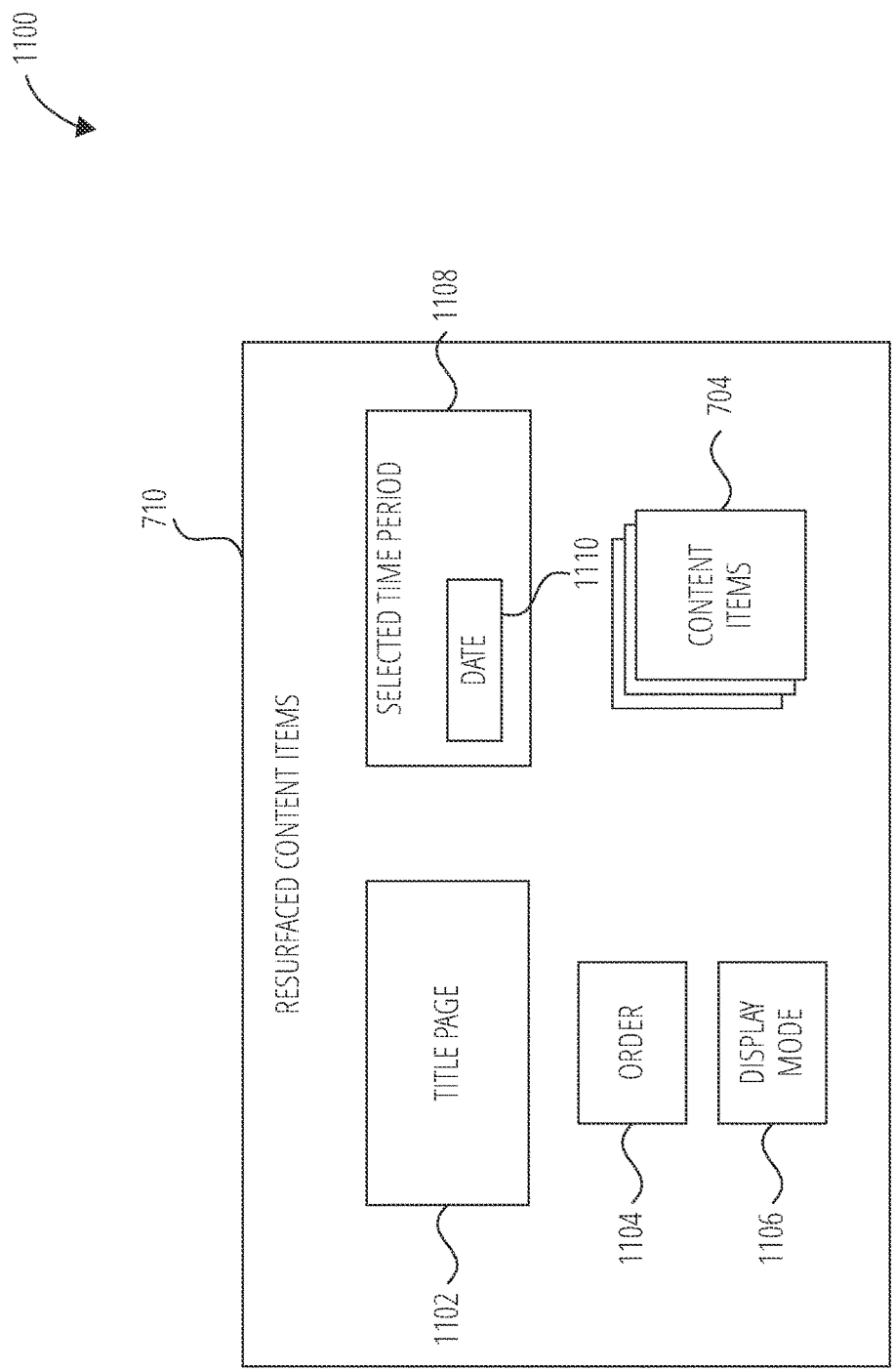
FIG. 11 illustrates resurfaced content items 710, in accordance with some embodiments.

FIG. 11 illustrates resurfaced content items 710, in accordance with some embodiments. The resurfaced content items 710 include title page 1102, display mode 1106, content items 704, order 1104, and selected time period 1108. The title page 1102 is described in conjunction with FIG. 12. The display mode 1106 indicates a mode with which the content items 704 is displayed on the client device 106 such as display a single content item of the content items 704 on a display of the client device 106, rotate through different content items 704, and so forth. The resurfaced content items 710 are those content items 704 that are selected to be part of the resurfaced content items 710. The order 1104 is the order that the content items 704 are to be presented to the user 722 on the client device 106 such as chronological, most popular, topical, and so forth. The selected time period 1108 is a calendar date 1110 or two calendar dates corresponding to dates when the content items 704 of the resurfaced content items 710 were generated. In some embodiments, a time period of the time periods 732 is limited to a time period of twenty-four hours. In some embodiments, a selected time period 1108 may be a date 1110 that includes two consecutive calendar dates such as Aug. 9, 2020 and Aug. 10, 2020 as a user 722 may be actively producing or generating content items 704 beyond midnight. For example, the user 722 may attend a rock concert and generate content items 704 throughout the evening of Aug. 9, 2020, and into the early hours of Aug. 10, 2020, such as through 4 AM on Aug. 10, 2020. The generate resurfaced content items module 706 determines the selected time period 1108, which includes the date 1110 for the selected time period 1108. In some embodiments, the selected time period 1108 is limited to a predetermined period of time such as a thirty-six hour period, twenty-four hour period, twelve-hour period, or another time period. Content items 704 included in the resurfaced content items 710 are content items 704 that were generated by the user 722 during the selected time period 1108. In some embodiments, all the content items 704 generated by the user 722 during the time period of the dates 736 are included in the resurfaced content items 710. In some embodiments, only content items 704 generated by the user 722 are included in the content items 704 and there are no content items 704 included that were generated by a different user 722.

Figure 12:
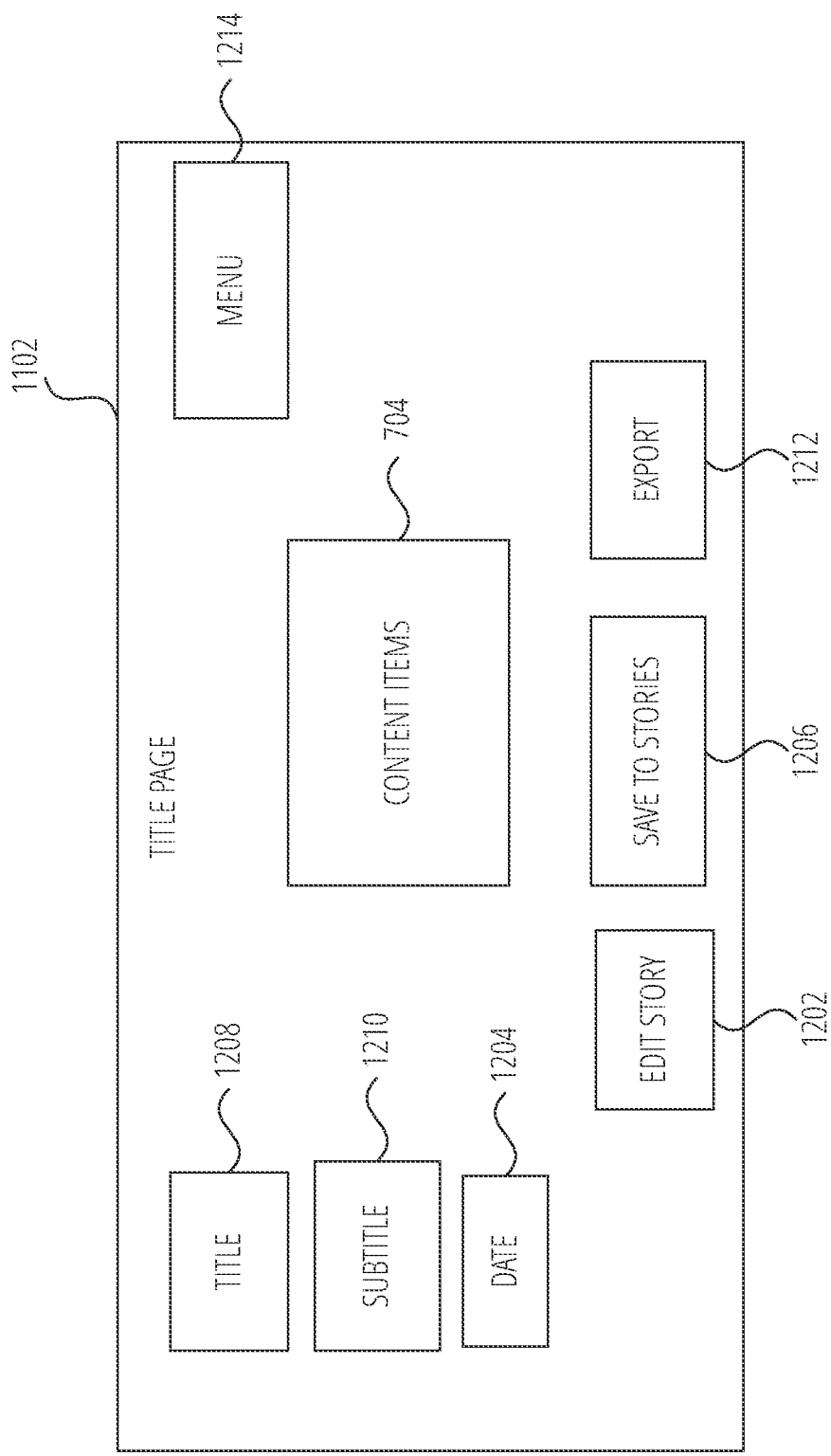
FIG. 12 illustrates a title page 1102, in accordance with some embodiments.

FIG. 12 illustrates a title page 1102, in accordance with some embodiments. The title page 1102 includes information for displaying to the user 722 on the client device 106. Illustrated in FIG. 12 is title 1208, subtitle 1210, date 1204, content items 704, edit story 1202, save to stories 1206, export 1212, and menu 1214. The content provider module 712 of FIG. 7 offers resurfaced content items 710 by causing the title page 1102 to be displayed on the client device 106, in accordance with some embodiments. The content items 704 are the same as content items 704 of FIG. 11.

The title 1208 is selected by generate resurfaced content items module 706, which may be based on selection criteria 708. For example, the generate resurfaced content items module 706 may chose the title 1208 based on a geographic location 812 of the content items 704 such as a neighborhood, city, park name, or the like. In another example, the generate resurfaced content items module 706 generates the title 1208 based on a user 722 name when many of the content items 704 include a face 816 of a same user 722. In another example, the generate resurfaced content items module 706 generates the title 1208 based on event information 728 such as a national holiday, a geographic location 812 indicating a venue with known events such as a rock concert, and so forth. The title 1208 may be a short phrase to enable the user 722 to easily identify the content items 704. The subtitle 1210 may optionally be included and, if included, may be selected similarly as the title 1208. Both the title 1208 and the subtitle 1210 are optional. The date 1204 is the same or similar as time periods 732 where the date 1204 may be a single date 1204 or more than one date 1204. In some embodiments, if the dates 736 include two calendar dates than the earlier calendar date is used.

User interface items are provided for the user 722 to determine what to do with the presented or offered resurfaced content items 710. The user interface items may include edit story 1202, save to stories 1206, export 1212, and a menu 1214. Other user interface items may be presented such as dismiss, do not show again, and so forth. The edit story 1202 user interface item enables the user 722 to edit the resurfaced content items 710, which may include deleting content items 704, adding content items 704, and modifying content items 704, which may be modified by the augmentation system 206. Other options may be available. The user 722 may send 908 the content items 704 as part of a message 400 to another user. The message 400 may be ephemeral. The export 1212 enables the user 722 access to other applications outside of the messaging system 100 such as an email program or other social media applications. The menu 1214 may provide additional user interface items such as dismiss and so forth.

Returning to FIG. 7, the content provider module 712 determines when to present or offer resurfaced content items 710 to the user 722 by displaying the title page 1102 on the client device 106. The user 722 may dismiss the resurfaced content items 710, in which case they may be placed on the queue 702 by the offer and edit module 716. In some embodiments, the content provider module 712 causes the title page 1102 to be displayed for a predetermined period of time on the client device 106 and if the user 722 does not select the resurfaced content items 710 corresponding to the title page 1102, then the content provider module 712 moves the resurfaced content items 710 to the queue 702. The content provider module 712 may select content to offer content to the user 722 from the queue 702, other content 714, or resurfaced content items 710. The content provider module 712 may have specific times that prompt the content provider module 712 to select content to offer to the user 722. For example, on certain days of the month such as the second, third, and fourth Friday of a month. In some embodiments, content provider module 712 will refrain from offering resurfaced content items 710 if the user 722 is receiving more than a predetermined number of content items 704 from other sources such as other users. The content provider module 712 may determine that other content 714 is more relevant to the user 722 and present other content 714 to the user 722 rather than the resurfaced content items 710. For example, if another user within the message messaging system 100 that user 722 follows produced a new story or new content, the content provider module 712 may select to offer the new story or new content to the user 722 rather than resurfaced content items 710.

If the content provider module 712 determines that a number of content items the user 722 has received is below a threshold, the content provider module 712 determines content to offer the user 722, in accordance with some examples. In this way, the content provider module 712 may engage the user 722 with the content available through the messaging server system 104.

Figure 13:
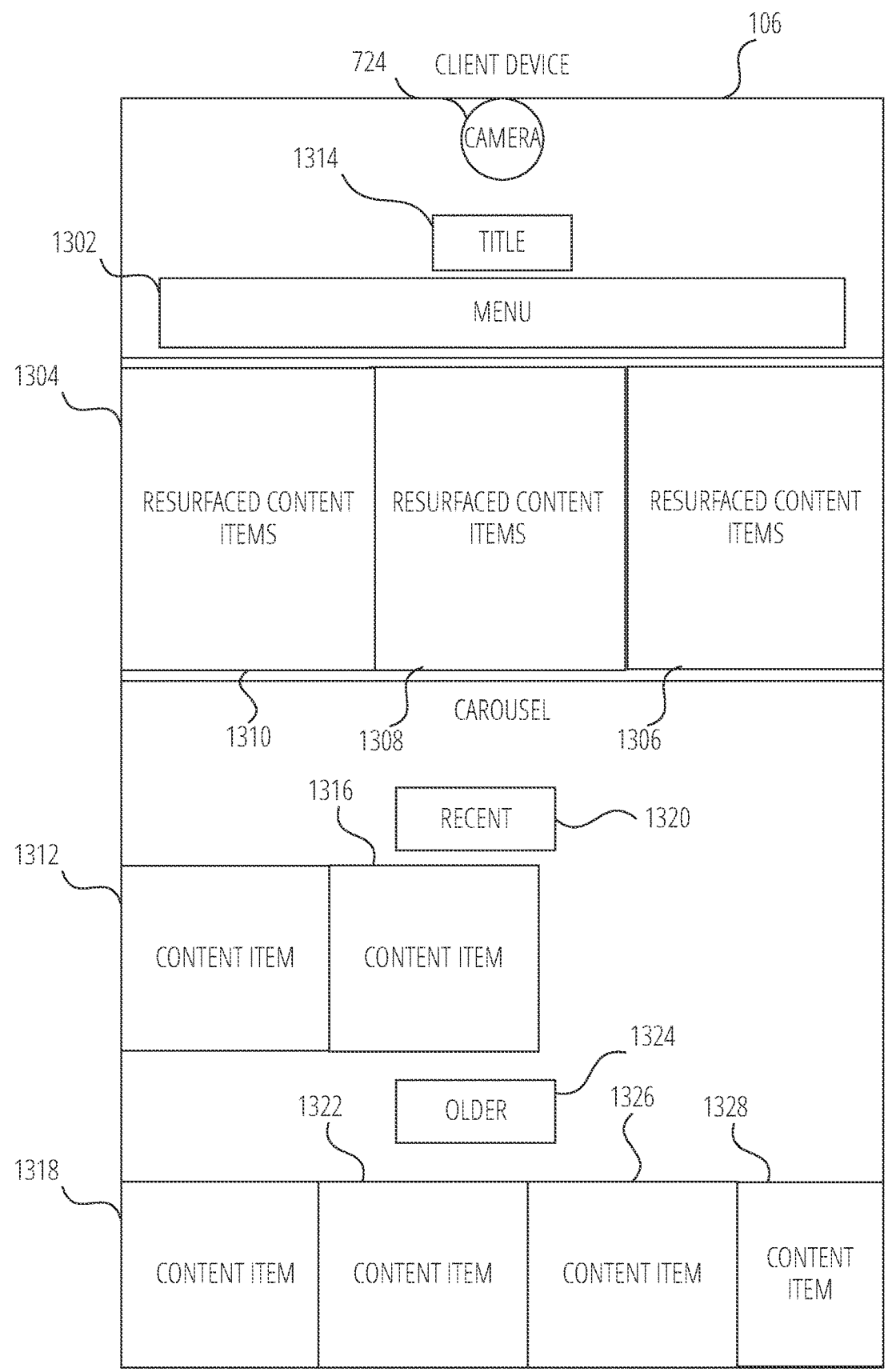
FIG. 13 illustrates a client device 106 displaying resurfaced content items, in accordance with some embodiments.

FIG. 13 illustrates a client device 106 displaying resurfaced content items, in accordance with some embodiments. Illustrated on a display of the client device 106 is title 1314, menu 1302, resurfaced content items 1310, resurfaced content items 1308, resurfaced content items 1306, recent 1320, content item 1312, content item 1316, older 1324, content item 1318, content item 1322, content item 1326, and content item 1328. The title 1314 indicates the subject of what is being displayed on the client device 106. For example, the title 1314 may be "Memories." The menu 1302 is a selector of different content to view, in accordance with some embodiments. For example, menu 1202 may indicate "Images", "Messages", "Stories", "Camera", and so forth, where as illustrated "Images" or "Messages" is selected. The carousel 1304 is a user interface item that may scroll, for example, in response to detecting a swipe left or right of a finger. The resurfaced content items 1310, the resurfaced content items 1308, and the resurfaced content items 1306 are the same or similar as resurfaced content items 710 with a title page 1102 being displayed. Recent 1320 is recently added content item 1312 and content item 1316. Recent 1320 may include a title such as "Recently Added." Older 1324 indicates that content item 1318, content item 1322, content item 1326, and content item 1328 were generated before recent 1320. Older 1324 may include an indication of a date such as "April 2020." Content item 1312, content item 1316, content item 1318, content item 1322, content item 1326, and content item 1328 may be images or videos. Referring back to FIG. 7, content provider module 712 includes offer and edit module 716, which may be configured to offer resurfaced content items 710 and to accommodate editing of the resurfaced content items 710. Offer and edit module 716 may have caused resurfaced content items 1310, resurfaced content items 1308, and resurfaced content items 1306 to be downloaded to the client device 106 or be generated on the client device 106, and then to be displayed on the client device 106. The user 722 may be presented with the one or more of the resurfaced content items 1310, the resurfaced content items 1308 and resurface resurfaced content items 1306. In some embodiments, the carousel 1304 may present other content 714. In some embodiments, the offer and edit module 716 presents or offers the resurfaced content items 1310, resurface resurfaced content items 1308, and resurfaced content items 1306, to the user 722 on the client device 106. If the user 722 does not interact with the presented or offered resurfaced content items 1310, resurface resurfaced content items 1308, or resurfaced content items 1306, for a predetermined period of time such as a day or more, then they may be placed on the queue 702 for later consideration.

Figure 14:
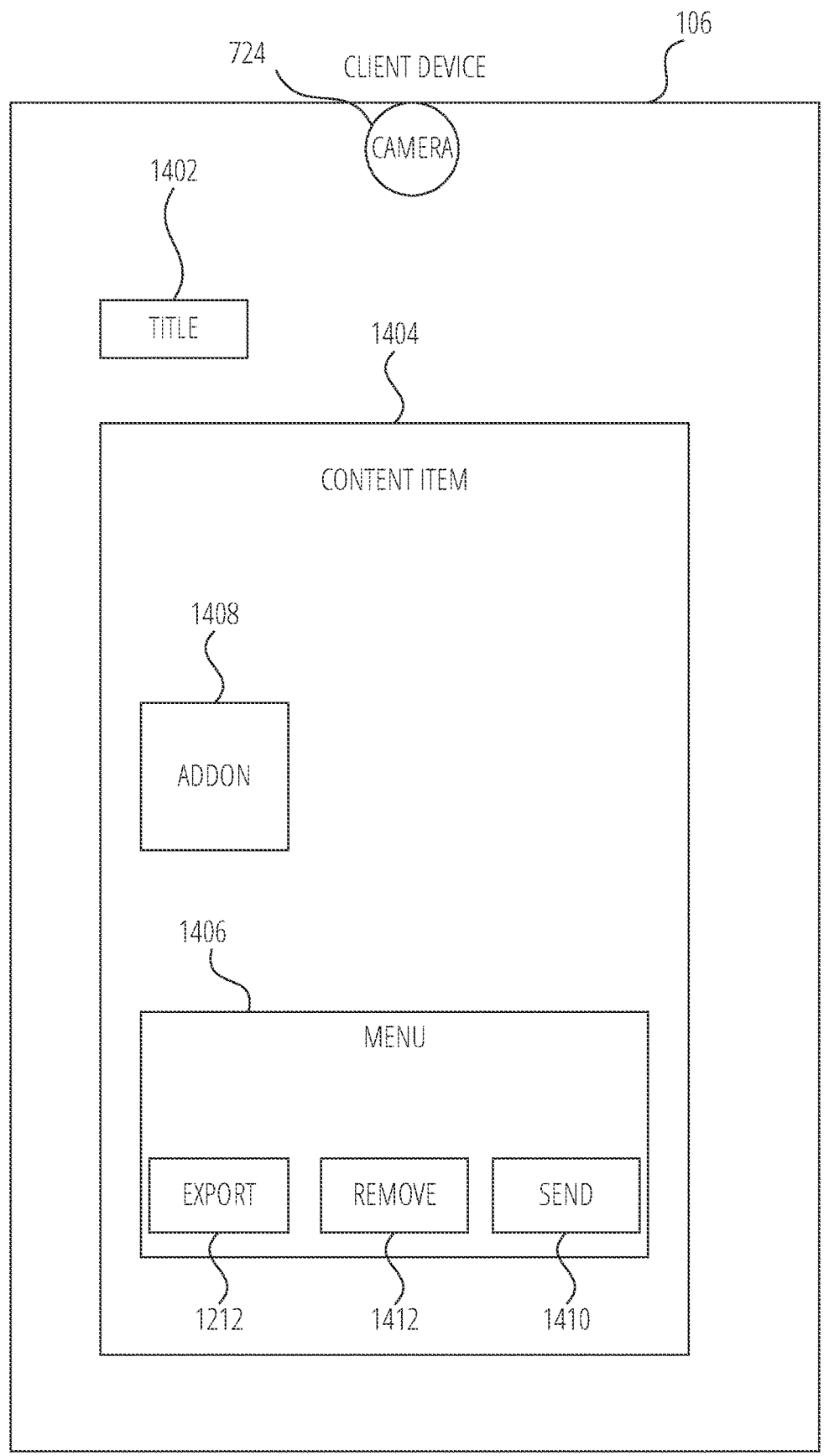
FIG. 14 illustrates a content item of resurfaced content items being displayed on a client device, in accordance with some embodiments.

FIG. 14 illustrates a content item 1404 of resurfaced content items being displayed on a client device 106, in accordance with some embodiments. Illustrated in FIG. 14 is client device 106, title 1402, content item 1404, addon 1408, menu 1406, export 1212, remove 1412, and send 1410. The presentation on the client device 106 is viewing a content item 1404 of the resurfaced content items 710 of FIG. 7. For example, the presentation on the client device 106 may have been reached by the user 722 selecting edit story 1202 of FIG. 12. In some embodiments, a long press on resurfaced content items 1310 of FIG. 13 would enable the user 722 to edit the content items 704 of the resurfaced content items 1310 and may bring the user to the presentation displayed on FIG. 14. The user 722 is presented with a content item 1404 of the content items 704 of the resurfaced content items 1310. The user 722 is given user interface items to perform operations on the content item 1404 that include export 1212, remove 1412, and send 1410. Other user interface items may be presented or accessible to the user 722 such as return to a previous presentation or application. Remove 1412 removes the content item 1404 from the resurfaced content items 710. Send 1410 enables the user 722 to send the content item 1404 or resurfaced content items 1310 to another user 722. Addon 1408 is modification data 808 to the content item 1404 such as "Rise and Shine" over an image or video of a desert camping ground. The title 1402 may include information such as a geographic location 812, date 810, a user 722 added title, and so forth.

Figure 15:
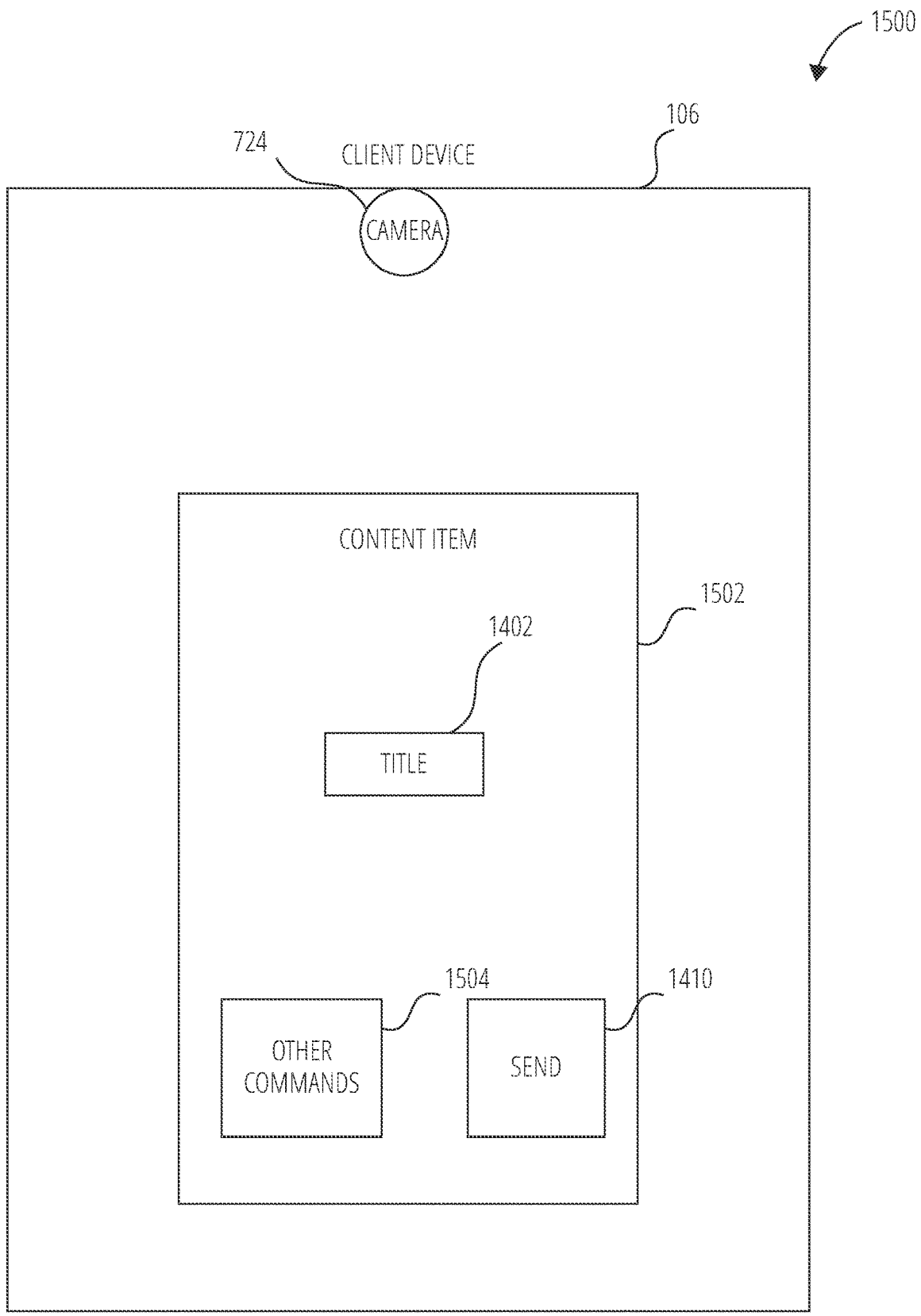
FIG. 15 illustrates a content item being displayed on a client device, in accordance with some embodiments.

FIG. 15 illustrates a content item 1502 being displayed on a client device 106, in accordance with some embodiments. Illustrated in FIG. 15 is client device 106, camera 724, content item 1502, title 1402, other commands 1504, and send 1410. The presentation on the client device 106 is a result of the user 722 viewing the content items 704 with content item 1502 being one of the content items 704 of resurfaced content items 710. The title 1402 may be the same as title 1402 of FIG. 14. The user 722 of FIG. 7 is presented with user interface items to perform operations on the content item 1502. The operations include send 1410 and other commands 1504. The other commands 1504 may include commands such as export 1212, remove 1412, and so forth. The content item 1502 may be an image of a sunset over a highway.

Figure 16:
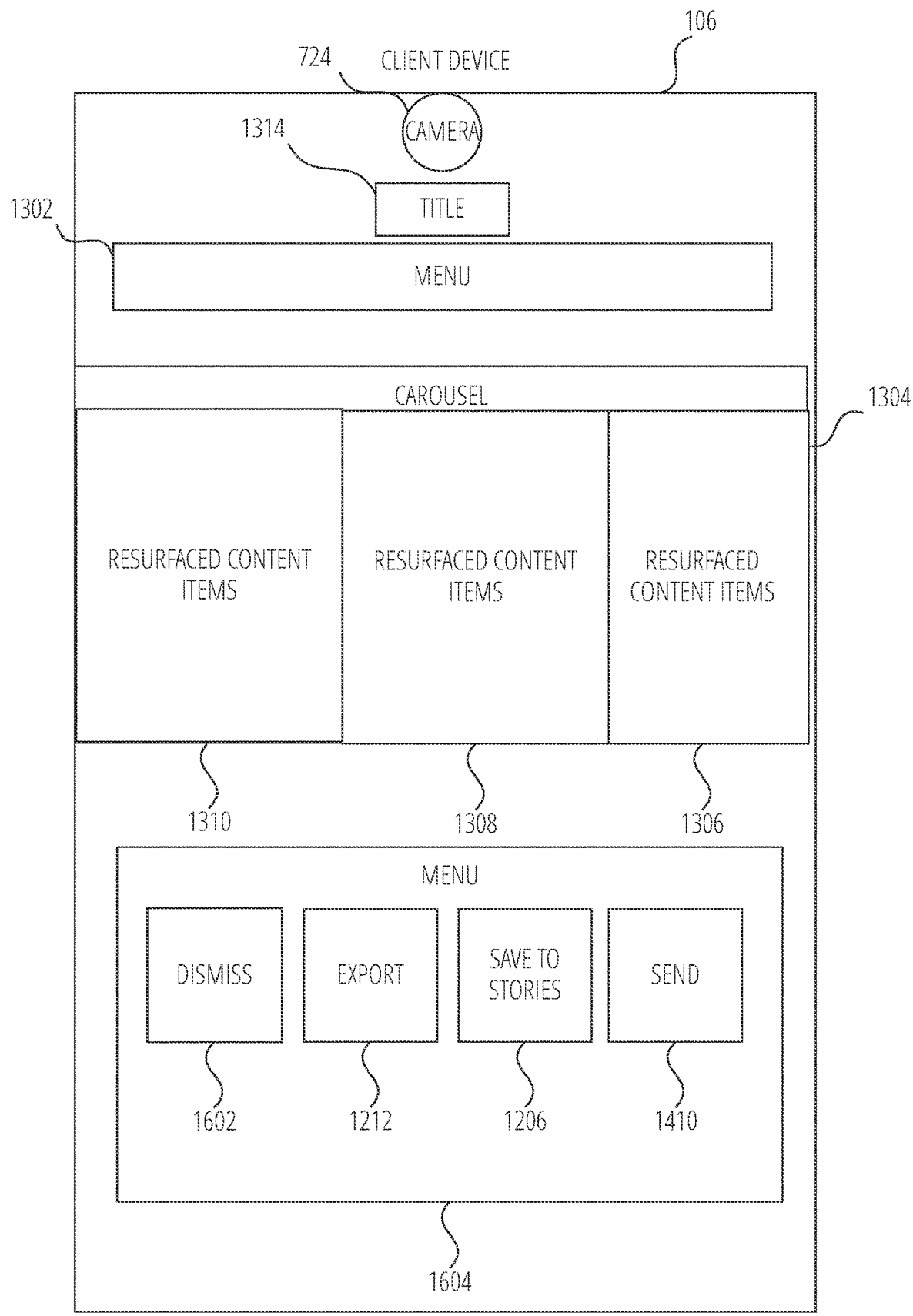
FIG. 16 illustrates a presentation when resurfaced content items is selected in FIG. 13, in accordance with some embodiments.

FIG. 16 illustrates a presentation when resurfaced content items is selected in FIG. 13, in accordance with some embodiments. When resurfaced content items 1310, resurfaced content items 1308, or resurfaced content items 1308 is selected, then a menu 1604 is offered with user interface items that include dismiss 1602, export 1212, save to stories 1206, and send 1410, in accordance with some embodiments. Other user interface items may be available for the user 722 to operate on the selected resurfaced content items 1310, resurfaced content items 1308, or resurfaced content items 1306. Referring to FIG. 7 and FIG. 16, and assuming that resurfaced content items 1308 is selected by the user 722, then dismiss 1602 will cause offer and edit module 716 to cause resurfaced content items 1308 to be removed from the client device 106 and for offer and edit module 716 to place resurfaced content items 1308 on the queue 702 to consider offering to the user 722 on another time. In some embodiments, offer and edit module 716 will determine that the user 722 is not interested in being offered resurfaced content items 1308 again and will delete resurfaced content items 1308 from the messaging server system 104.

Figure 17:
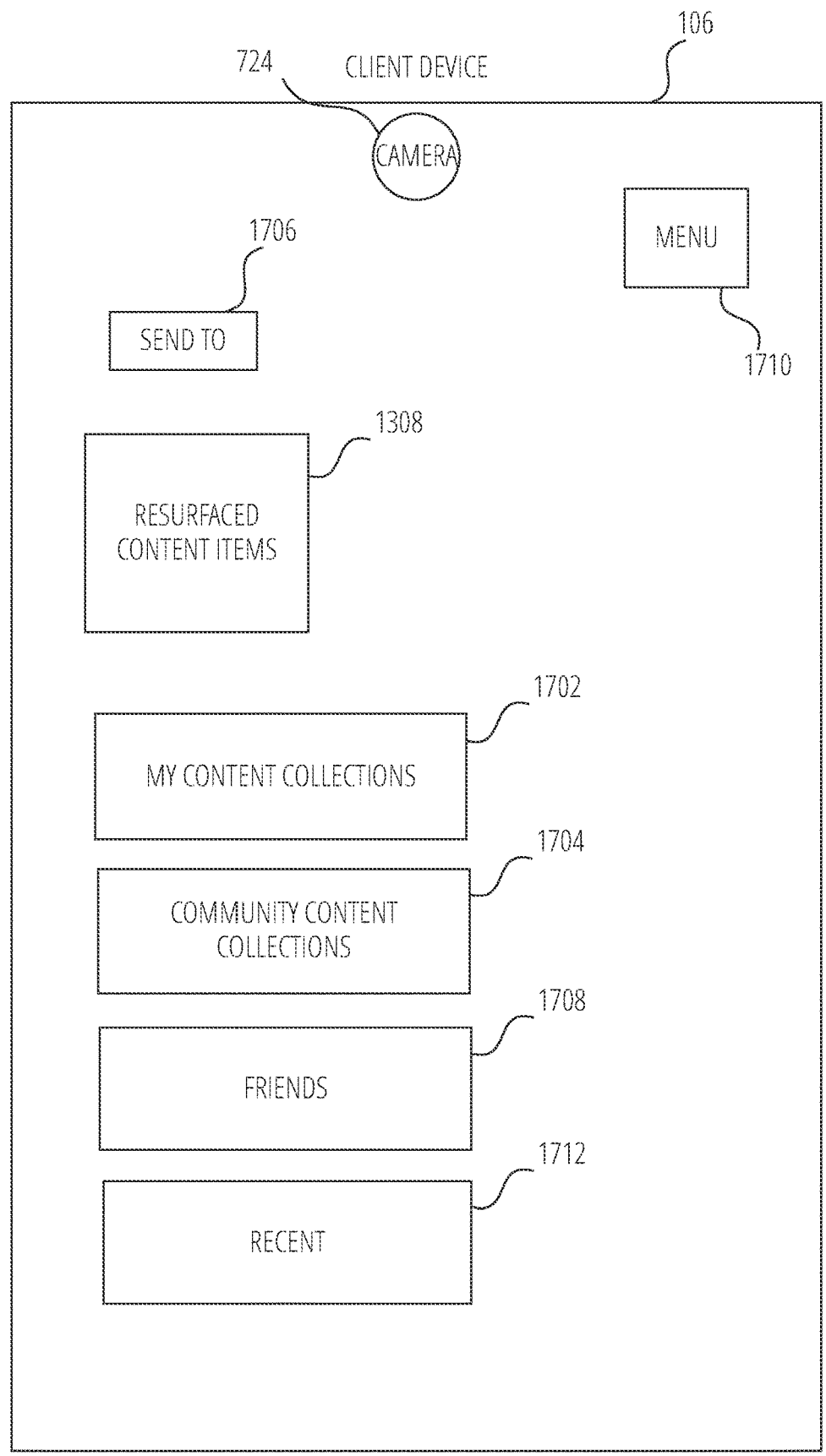
FIG. 17 illustrates a presentation when resurfaced content items is selected to be sent, in accordance with some embodiments.

FIG. 17 illustrates a presentation when resurfaced content items 1308 is selected to be sent, in accordance with some embodiments. Send to 1706 indicates that user interface items are presented that enable the user 722 to send the resurfaced content items 1308 to my content collections 1702, community content collections 1704, friends 1708, and recent 1712. My content collections 1702 includes story table 316 for the user 722. Community content collections 1704 includes collections that make the content items 704 of resurfaced content items 1308 available to other users of the messaging system 100.

Friends 1708 are other users that are friends of the user 722 within the messaging server system 104. Recent 1712 is a cache of recent places the user 722 has sent content items 704. In some embodiments, the user 722 may enter text in a search box provided with send to 1706. The menu 1710 may provide additional user interface items that enable the user to perform additional operations on the resurfaced content items 1308 or to perform operations such as exiting the messaging system 100 or returning to a previous screen or presentation.

Machine Architecture

Figure 18:
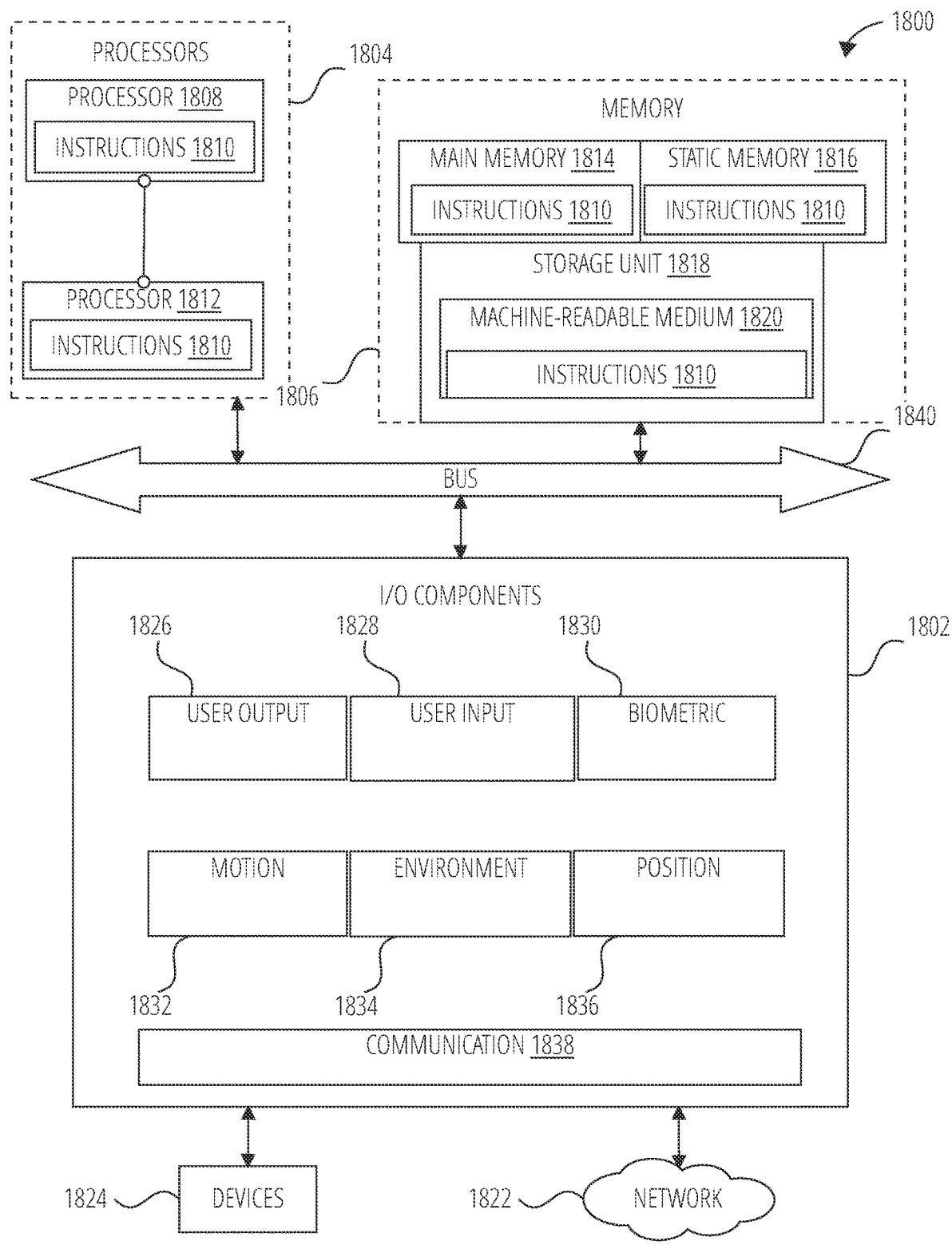
FIG. 18 is a diagrammatic representation of a machine in the form of a computer system within which a set of instructions may be executed for causing the machine to perform any one or more of the methodologies discussed herein, in accordance with some examples.

FIG. 18 is a diagrammatic representation of the machine 1800 within which instructions 1810 (e.g., software, a program, an application, an applet, an app, or other executable code) for causing the machine 1800 to perform any one or more of the methodologies discussed herein may be executed. For example, the instructions 1810 may cause the machine 1800 to execute any one or more of the methods described herein. The instructions 1810 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1810, sequentially or otherwise, that specify actions to be taken by the machine 1800. Further, while only a single machine 1800 is illustrated, the term "machine" shall also be taken to include a collection of machines that individually or jointly execute the instructions 1810 to perform any one or more of the methodologies discussed herein. The machine 1800, for example, may comprise the client device 106 or any one of a number of server devices forming part of the messaging server system 104. In some examples, the machine 1800 may also comprise both client and server systems, with certain operations of a particular method or algorithm being performed on the server-side and with certain operations of the particular method or algorithm being performed on the client-side.

The machine 1800 may include processors 1804, memory 1806, and input/output I/O components 638, which may be configured to communicate with each other via a bus 1840. In an example, the processors 1804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1808 and a processor 1812 that execute the instructions 1810. The term "processor" is intended to include multi-core processors that may comprise two or more independent processors (sometimes referred to as "cores") that may execute instructions contemporaneously. Although FIG. 18 shows multiple processors 1804, the machine 1800 may include a single processor with a single-core, a single processor with multiple cores (e.g., a multi-core processor), multiple processors with a single core, multiple processors with multiples cores, or any combination thereof.

The memory 1806 includes a main memory 1814, a static memory 1816, and a storage unit 1818, both accessible to the processors 1804 via the bus 1840. The main memory 1806, the static memory 1816, and storage unit 1818 store the instructions 1810 embodying any one or more of the methodologies or functions described herein. The instructions 1810 may also reside, completely or partially, within the main memory 1814, within the static memory 1816, within machine-readable medium 1820 within the storage unit 1818, within at least one of the processors 1804 (e.g., within the Processor's cache memory), or any suitable combination thereof, during execution thereof by the machine 1800.

The I/O components 1802 may include a wide variety of components to receive input, provide output, produce output, transmit information, exchange information, capture measurements, and so on. The specific I/O components 1802 that are included in a particular machine will depend on the type of machine. For example, portable machines such as mobile phones may include a touch input device or other such input mechanisms, while a headless server machine will likely not include such a touch input device. It will be appreciated that the I/O components 1802 may include many other components that are not shown in FIG. 18. In various examples, the I/O components 1802 may include user output components 1826 and user input components 1828. The user output components 1826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1802 may include biometric components 1830, motion components 1832, environmental components 1834, or position components 1836, among a wide array of other components. For example, the biometric components 1830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1832 include acceleration sensor components (e.g., accelerometer), gravitation sensor components, rotation sensor components (e.g., gyroscope).

The environmental components 1834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 1836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1802 further include communication components 1838 operable to couple the machine 1800 to a network 1822 or devices 1824 via respective coupling or connections. For example, the communication components 1838 may include a network interface Component or another suitable device to interface with the network 1822. In further examples, the communication components 1838 may include wired communication components, wireless communication components, cellular communication components, Near Field Communication (NFC) components, Bluetooth® components (e.g., Bluetooth® Low Energy). Wi-Fi® components, and other communication components to provide communication via other modalities. The devices 1824 may be another machine or any of a wide variety of peripheral devices (e.g., a peripheral device coupled via a USB).

Moreover, the communication components 1838 may detect identifiers or include components operable to detect identifiers. For example, the communication components 1838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1838, such as location via Internet Protocol (IP) geolocation, location via Wi-Fi® signal triangulation, location via detecting an NFC beacon signal that may indicate a particular location, and so forth.

The various memories (e.g., main memory 1814, static memory 1816, and memory of the processors 1804) and storage unit 1818 may store one or more sets of instructions and data structures (e.g., software) embodying or used by any one or more of the methodologies or functions described herein. These instructions (e.g., the instructions 1810), when executed by processors 1804, cause various operations to implement the disclosed examples.

The instructions 1810 may be transmitted or received over the network 1822, using a transmission medium, via a network interface device (e.g., a network interface component included in the communication components 1838) and using any one of several well-known transfer protocols (e.g., hypertext transfer protocol (HTTP)). Similarly, the instructions 1810 may be transmitted or received using a transmission medium via a coupling (e.g., a peer-to-peer coupling) to the devices 1824.

Software Architecture

Figure 19:
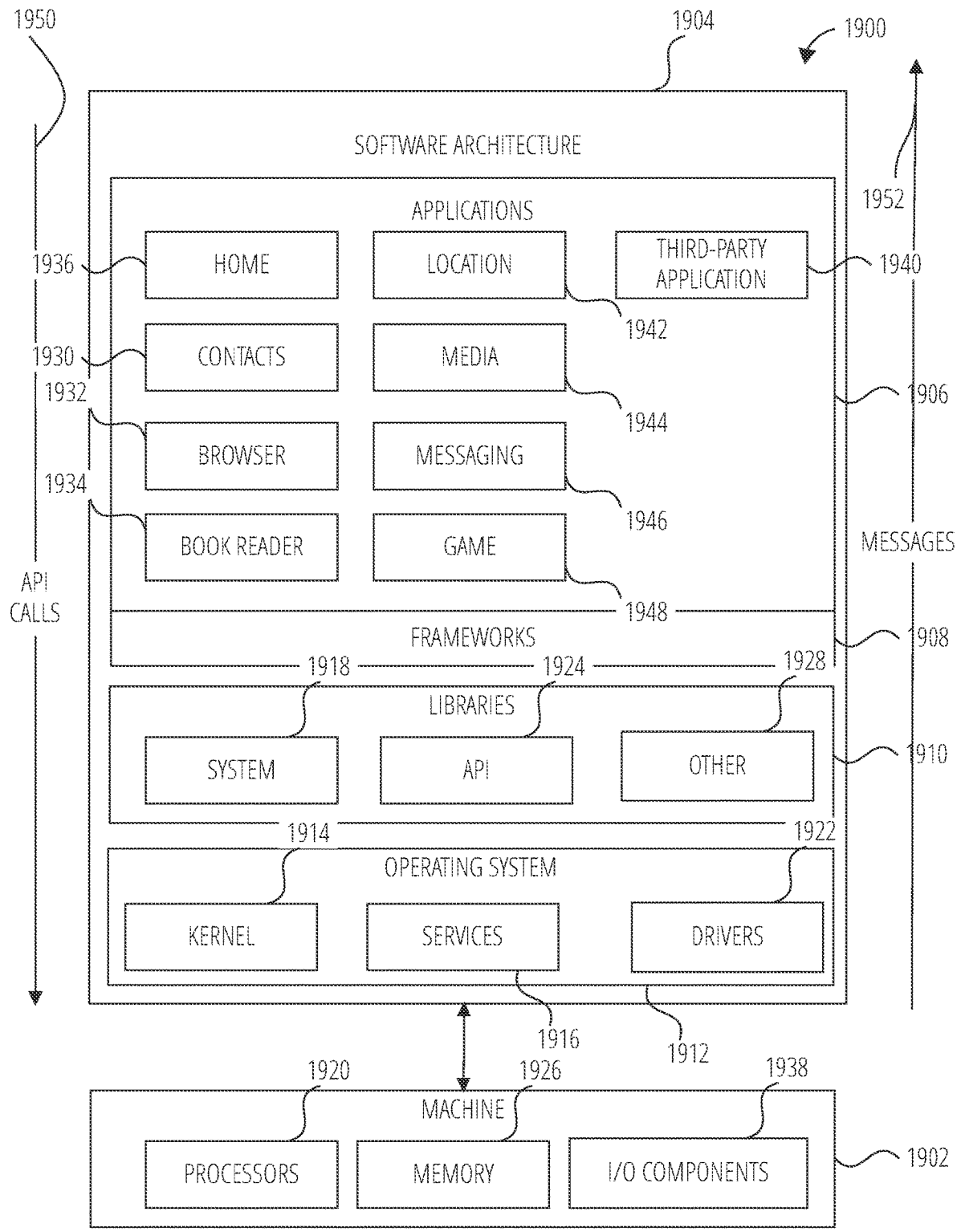
FIG. 19 is a block diagram showing a software architecture within which examples may be implemented.

FIG. 19 is a block diagram 1900 illustrating a software architecture 1904, which can be installed on any one or more of the devices described herein. The software architecture 1904 is supported by hardware such as a machine 1902 that includes processors 1920, memory 1926, and I/O components 1938. In this example, the software architecture 1904 can be conceptualized as a stack of layers, where each layer provides a particular functionality. The software architecture 1904 includes layers such as an operating system 1912, libraries 1910, frameworks 1908, and applications 1906. Operationally, the applications 1906 invoke API calls 1950 through the software stack and receive messages 1952 in response to the API calls 1950.

The operating system 1912 manages hardware resources and provides common services. The operating system 1912 includes, for example, a kernel 1914, services 1916, and drivers 1922. The kernel 1914 acts as an abstraction layer between the hardware and the other software layers. For example, the kernel 1914 provides memory management, processor management (e.g., scheduling), component management, networking, and security settings, among other functionality. The services 1916 can provide other common services for the other software layers. The drivers 1922 are responsible for controlling or interfacing with the underlying hardware. For instance, the drivers 1922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1910 provide a common low-level infrastructure used by the applications 1906. The libraries 1910 can include system libraries 1918 (e.g., C standard library) that provide functions such as memory allocation functions, string manipulation functions, mathematic functions, and the like. In addition, the libraries 1910 can include API libraries 1924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D)

and three dimensions (3D) in a graphic content on a display), database libraries (e.g., SQLite to provide various relational database functions), web libraries (e.g., WebKit to provide web browsing functionality), and the like. The libraries 1910 can also include a wide variety of other libraries 1928 to provide many other APIs to the applications 1906.

The frameworks 1908 provide a common high-level infrastructure that is used by the applications 1906. For example, the frameworks 1908 provide various graphical user interface (GUI) functions, high-level resource management, and high-level location services. The frameworks 1908 can provide a broad spectrum of other APIs that can be used by the applications 1906, some of which may be specific to a particular operating system or platform.

In an example, the applications 1906 may include a home application 1936, a contacts application 1930, a browser application 1932, a book reader application 1934, a location application 1942, a media application 1944, a messaging application 1946, a game application 1948, and a broad assortment of other applications such as a third-party application 1940. The applications 1906 are programs that execute functions defined in the programs. Various programming languages can be employed to create one or more of the applications 1906, structured in a variety of manners, such as object-oriented programming languages (e.g., Objective-C, Java, or C++) or procedural programming languages (e.g., C or assembly language). In a specific example, the third-party application 1940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1940 can invoke the API calls 1950 provided by the operating system 1912 to facilitate functionality described herein.

Processing Components

Figure 20:
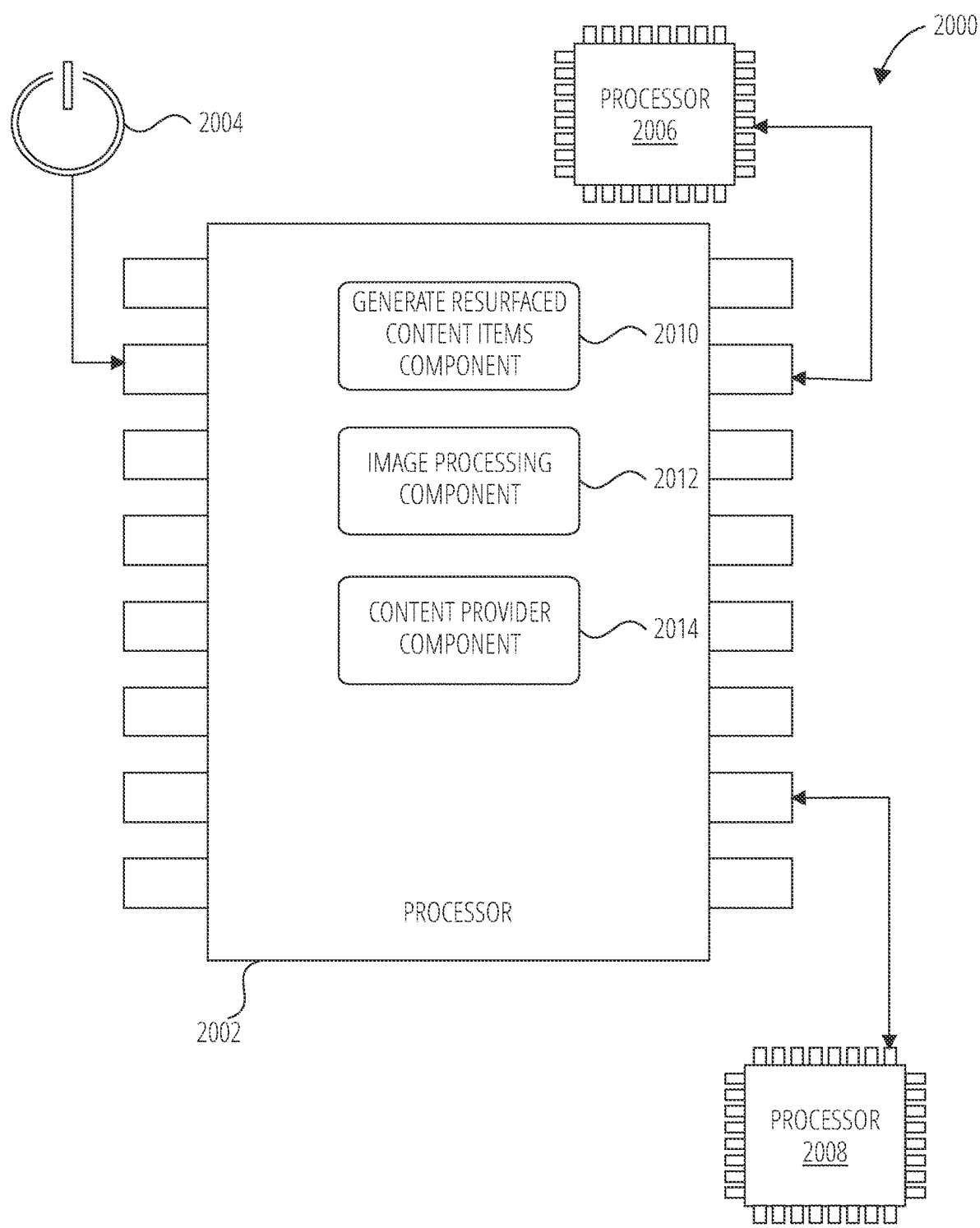
FIG. 20 is a diagrammatic representation of a processing environment, in accordance with some examples.

Turning now to FIG. 20, there is shown a diagrammatic representation of a processing environment 2000, which includes a processor 2002, a processor 2006, and a processor 2008 (e.g., a GPU, CPU or combination thereof).

The processor 2002 is shown to be coupled to a power source 2004, and to include (either permanently configured or temporarily instantiated) modules, namely a generate resurfaced content items component 2010, an Image processing component 2012, and a Content provider component 2014. The generate resurfaced content items component 2010 operationally generates resurfaced content items 710 the image processing component 2012 operationally generates objects 814, and the content provider component 2014 operationally causing the presentation of resurfaced content items 1306 on a screen of the client device 106. As illustrated, the processor 2002 is communicatively coupled to both the processor 2006 and the processor 2008.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of resurfacing content items on a messaging system, comprising:
storing content items generated by a client device of a user, the content items stored with associated social interaction data, viewing data, modification data, and a date, wherein the social interaction data comprises a number of times the content items were liked by the other users, a number of times the content items were commented on by the other users, and a number of times users that were sent the content items resent, to other users, the content items;
determining a time period and content items corresponding to the time period to resurface to the user, the time period selected based on comparing the social interaction data, the viewing data, and the modification data associated with the content items corresponding to the time period with the social interaction data, the viewing data, and the modification data associated with content items generated during other time periods, wherein in the comparing the modification data added to the content items by the user is given more weight than the social interaction data and the viewing data are given;
generating an order of the content items corresponding to the time period to resurface to the user;
generating a title page for the time period to resurface to the user, the title page comprising a title and an indication of a date for the time period; and
causing to be displayed, on a display of the client device, the title page with user interface items, the user interface items comprising options for the user to dismiss the time period and the content items corresponding to the time period, to send the content items corresponding to the time period to another user, and to edit the content items corresponding to the time period.

2. The method of claim 1, wherein the modification data comprises text captions and media overlays added to the content items corresponding to the time period.

3. The method of claim 2, wherein the media overlays comprise audio content, visual content, and visual effects.

4. The method of claim 1, wherein the viewing data comprising a number of times the content items corresponding to the time period were viewed by the user.

5. The method of claim 1 further comprising:
refraining from excluding a content item of the content items corresponding to the time period to resurface to the user.

6. The method of claim 1, further comprising refraining from including a content item generated by a different user in the content items corresponding to the time period.

7. The method of claim 1, wherein the content items each comprise an image or video.

8. The method of claim 1, wherein the social interaction data, the viewing data, and the modification data associated with the content items corresponding to the time period includes social interaction data, viewing data, and modification data from after the time period.

9. The method of claim 1, wherein the determining the time period and content items corresponding to the time period is further based on a number of content items generated during the time period being greater than a predetermined percentage of a number of content items generated during other time periods.

10. The method of claim 9, wherein the determining the time period and content items corresponding to the time period is further based on comparing the content items corresponding to the time period with other content available in the messaging system.

11. The method of claim 10, wherein the title page is displayed on the client device for a predetermined period of time; and
in response to the user refraining from selecting a user interface item of the user interface items, placing the content items corresponding to the time period on a queue to display to the user another time.

12. The method of claim 1 further comprising:
associating the content items corresponding to the time period with an event; and
associating the title with a name of the event.

13. The method of claim 1, wherein the determining the time period and content items corresponding to the time period further comprises:
receiving the social interaction data, the viewing data, and the modification data associated with content items generated during the time period;
determining a score for each of the social interaction data, the viewing data, and the modification data; and
adding the score to a time period score for the time period.

14. The method of claim 13, wherein the social interaction data, the viewing data, and the modification data associated with the time period are received as they are generated, and wherein the method further comprises:
discarding the social interaction data, the viewing data, and the modification data after the score is determined.

15. A non-transitory computer-readable storage medium including instructions that, when processed by a computer, configure the computer to perform the method of claim 1.

16. The method of claim 1 wherein the time period comprises a period of time less than or equal to twenty-four hours that includes one or two calendar dates.

17. A computing apparatus, the computing apparatus comprising:
a processor; and
a memory storing instructions that, when executed by the processor, configure the apparatus to perform operations comprising:
storing content items generated by a client device of a user, the content items stored with associated social interaction data, viewing data, modification data, and a date, wherein the social interaction data comprises a number of times the content items were liked by the other users, a number of times the content items were commented on by the other users, and a number of times users that were sent the content items resent, to other users, the content items;
determining a time period and content items corresponding to the time period to resurface to the user, the time period selected based on comparing the social interaction data, the viewing data, and the modification data associated with the content items corresponding to the time period with the social interaction data, the viewing data, and the modification data associated with content items generated during other time periods, wherein in the comparing the modification data added to the content items by the user is given more weight than the social interaction data and the viewing data are given;
generating an order of the content items corresponding to the time period to resurface to the user;
generating a title page for the time period to resurface to the user, the title page comprising a title and an indication of a date for the time period; and
causing to be displayed, on a display of the client device, the title page with user interface items, the user interface items comprising options for the user to dismiss the time period and the content items corresponding to the time period, to send the content items corresponding to the time period to another user, and to edit the content items corresponding to the time period.

18. The computing apparatus of claim 17, wherein the modification data comprises text captions and media overlays added to the content items corresponding to the time period.

19. The computing apparatus of claim 17 wherein the time period comprises a period of time less than or equal to twenty-four hours that includes one or two calendar dates.

* * * * *